(12) United States Patent
Mori

(10) Patent No.: US 10,691,815 B2
(45) Date of Patent: Jun. 23, 2020

(54) ATTRIBUTE LINKAGE APPARATUS, TRANSFER SYSTEM, ATTRIBUTE LINKAGE METHOD AND COMPUTER READABLE MEDIUM

(71) Applicant: MITSUBISHI ELECTRIC CORPORATION, Tokyo (JP)

(72) Inventor: Takumi Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/081,391

(22) PCT Filed: Apr. 27, 2016

(86) PCT No.: PCT/JP2016/063187
§ 371 (c)(1),
(2) Date: Aug. 30, 2018

(87) PCT Pub. No.: WO2017/187552
PCT Pub. Date: Nov. 2, 2017

(65) Prior Publication Data
US 2019/0095634 A1    Mar. 28, 2019

(51) Int. Cl.
G06F 21/62    (2013.01)
H04L 9/08    (2006.01)
H04L 9/30    (2006.01)

(52) U.S. Cl.
CPC ............ *G06F 21/62* (2013.01); *H04L 9/0861* (2013.01); *H04L 9/0894* (2013.01); *H04L 9/30* (2013.01)

(58) Field of Classification Search
CPC ..... G06F 21/62; H04L 9/0894; H04L 9/0861; H04L 9/30
See application file for complete search history.

(56) References Cited

U.S. PATENT DOCUMENTS

2012/0096258 A1    4/2012 Naono et al.
2013/0028415 A1    1/2013 Takashima et al.
(Continued)

FOREIGN PATENT DOCUMENTS

JP    10-260903 A    9/1998
JP    2008-210101 A    9/2008
(Continued)

OTHER PUBLICATIONS

International Search Report for PCT/JP2016/063187 (PCT/ISA/210) dated Jul. 12, 2016.

*Primary Examiner* — Nelson S. Giddins
(74) *Attorney, Agent, or Firm* — Birch Stewart Kolasch & Birch LLP.

(57) ABSTRACT

An attribute linkage apparatus (20) transmits attribute information managed by each of a plurality of data management apparatuses (30) to a certain data management apparatus (30) and causes the data management apparatus to specify an access condition to data according to the attribute information and then store the data. The attribute linkage apparatus (20) transmits access information in which attribute information relating to a target user out of the attribute information managed by each of the plurality of data management apparatuses (30) has been set to a certain data management apparatus (30), and causes the data management apparatus to determine whether the access condition is satisfied according to the access information and control an access to data.

16 Claims, 37 Drawing Sheets

(56) References Cited

U.S. PATENT DOCUMENTS

| | | | |
|---|---|---|---|
| 2013/0312067 A1* | 11/2013 | Ogura | H04L 65/1069 |
| | | | 726/4 |
| 2014/0181514 A1 | 6/2014 | Aoyagi et al. | |
| 2015/0200917 A1 | 7/2015 | Fujii et al. | |
| 2016/0127335 A1 | 5/2016 | Yamamoto et al. | |
| 2016/0253517 A1 | 9/2016 | Mori et al. | |
| 2016/0254914 A1 | 9/2016 | Saito et al. | |
| 2016/0294553 A1 | 10/2016 | Hattori et al. | |
| 2018/0144148 A1* | 5/2018 | Rattan | G06F 21/602 |

FOREIGN PATENT DOCUMENTS

| | | |
|---|---|---|
| JP | 2010-244432 A | 10/2010 |
| JP | 2012-3362 A | 1/2012 |
| JP | 2013-150026 A | 8/2013 |
| JP | 2013-150309 A | 8/2013 |
| JP | 2013-243553 A | 12/2013 |
| JP | 2014-68165 A | 4/2014 |
| JP | 2014-127721 A | 7/2014 |
| JP | 2015-33068 A | 2/2015 |
| WO | WO 2010/119552 A1 | 10/2010 |
| WO | WO 2011/135895 A1 | 11/2011 |
| WO | WO 2014/083784 A1 | 6/2014 |
| WO | WO 2015/008769 A1 | 1/2015 |
| WO | WO 2015/056601 A1 | 4/2015 |
| WO | WO 2015/072203 A1 | 5/2015 |
| WO | WO 2015/087407 A1 | 6/2015 |

\* cited by examiner

Fig. 5

221 LINKAGE INFORMATION STORAGE SECTION

| DOMAIN | APPARATUS ID | SOURCE INFORMATION |
|---|---|---|
| domain1 | Dev1 | ldap://ldap.samplecloud.com |
| domain2 | Dev2 | ldaps.//securecloudservice.com 636 |
| ... | ... | ... |

Fig. 8

| RECORD NUMBER | USER ATTRIBUTE |
|---|---|
| 1 | ID = A10002, NAME = SATO TETSUYA, DEPARTMENT = ACCOUNTING DEPARTMENT, DIVISION = BUDGET DIVISION, POSITION = HEAD OF DIVISION |
| 2 | ID = A10001, NAME = SUZUKI KENICHI, DEPARTMENT = ACCOUNTING DEPARTMENT, DIVISION = NULL, POSITION = HEAD OF DEPARTMENT |
| 3 | ID = B10001, NAME = TAKAHASHI HIROSHI, DEPARTMENT = PERSONNEL DEPARTMENT, DIVISION = NULL, POSITION = HEAD OF DEPARTMENT |
| 4 | ID = A10003, NAME = KOBAYASHI CHIKO, DEPARTMENT = ACCOUNTING DEPARTMENT, DIVISION = BUDGET DIVISION, POSITION = PERSON IN CHARGE |

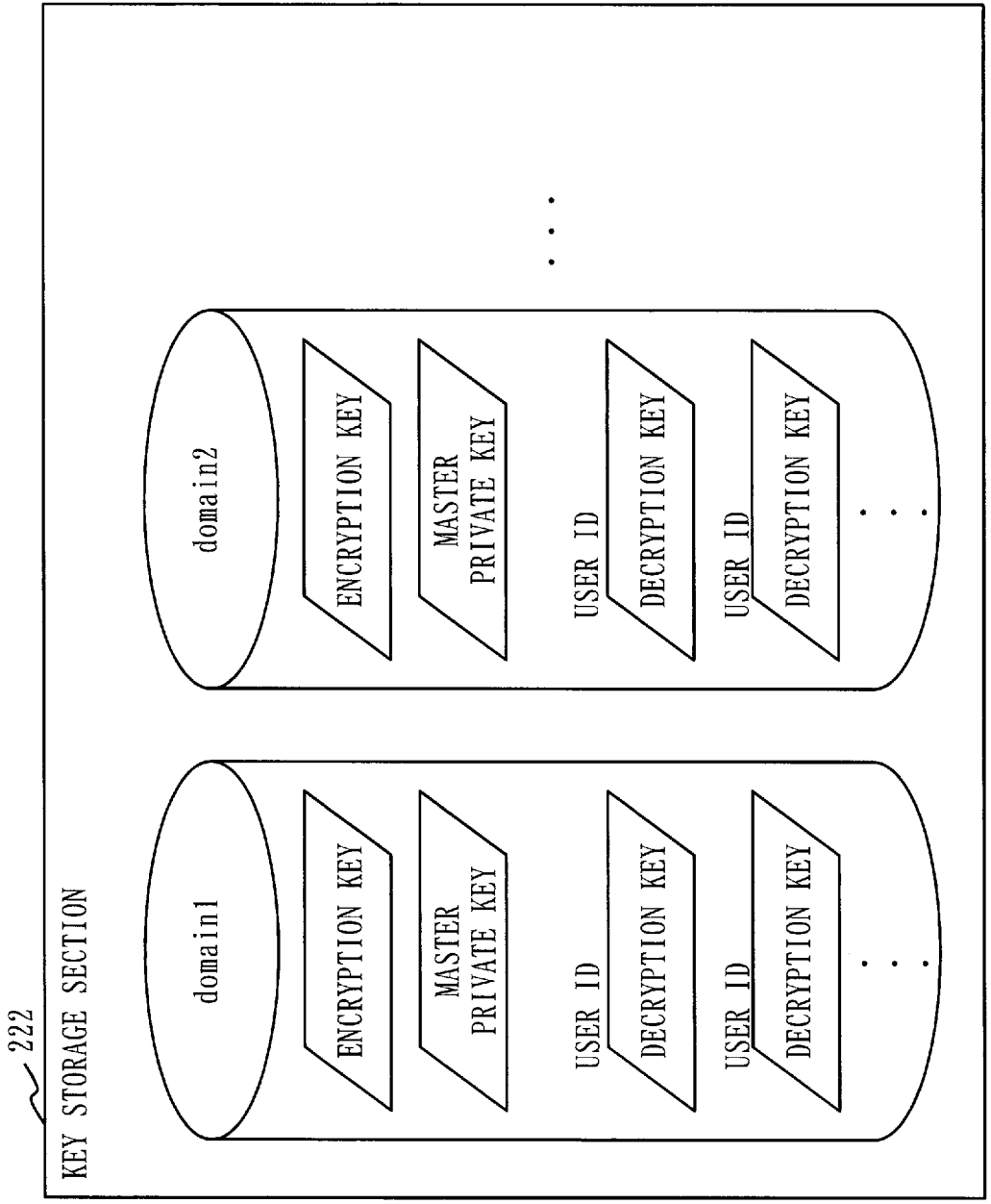

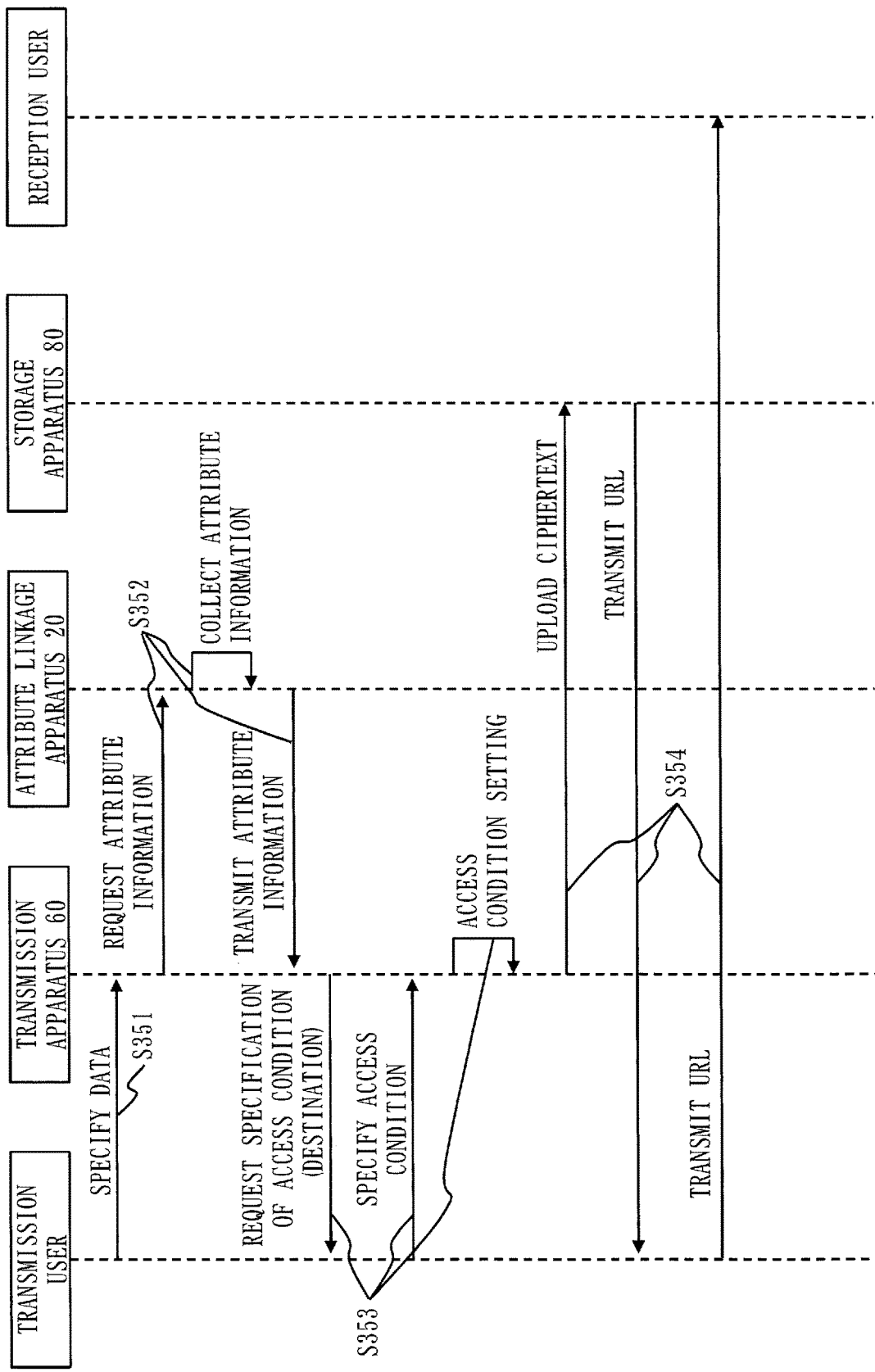

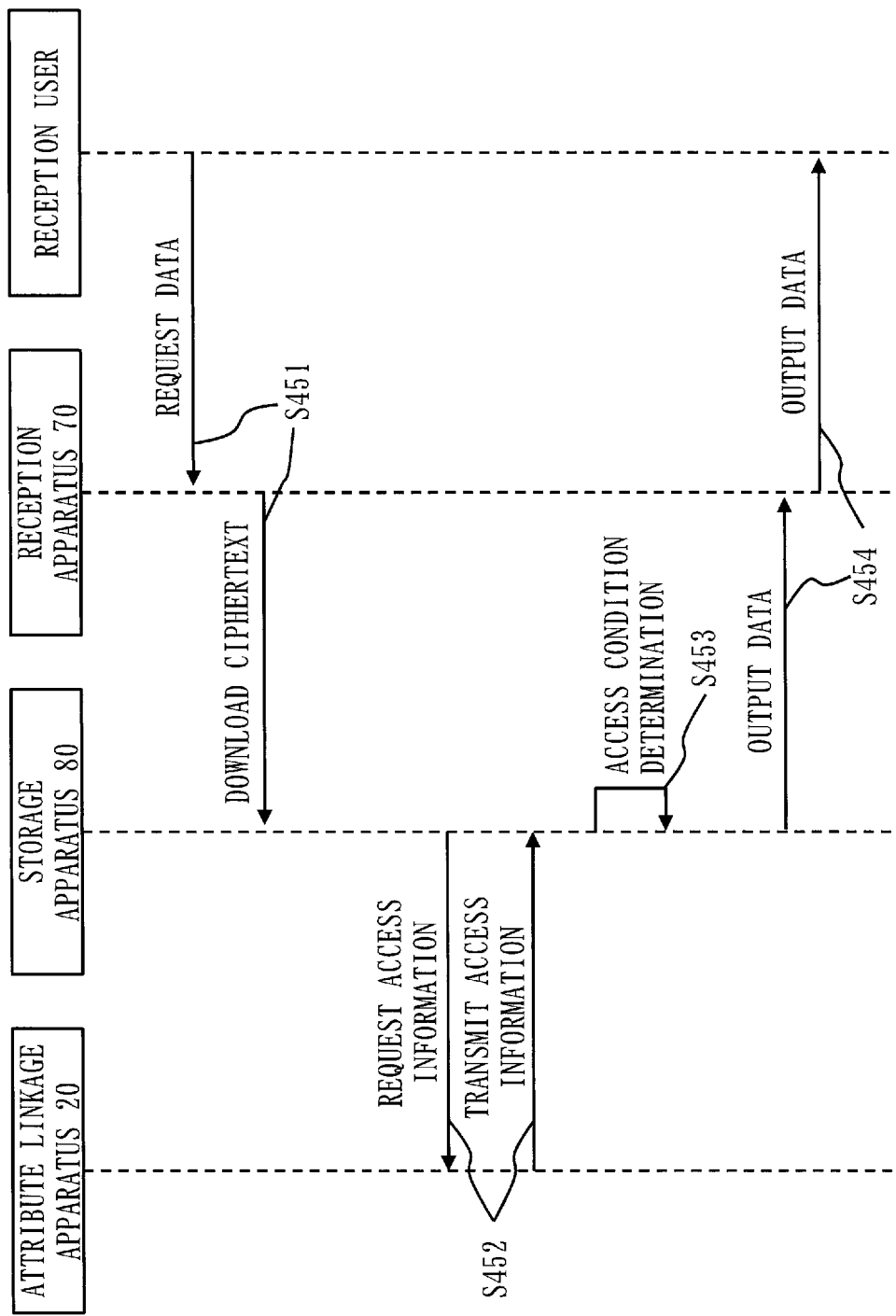

ATTRIBUTE LINKAGE APPARATUS, TRANSFER SYSTEM, ATTRIBUTE LINKAGE METHOD AND COMPUTER READABLE MEDIUM

TECHNICAL FIELD

The present invention relates to a technique for managing data with a plurality of data management apparatuses.

BACKGROUND ART

Digitized data may be stored in a data management apparatus called cloud storage or file server connected to the Internet, and may be used from various apparatus such as a laptop, a tablet device and a smart phone. Although such a method of using data has high convenience, there is a risk that data may be browsed by a third party on the Internet unintentionally. Therefore, it is essential to operate information security such as encryption or access restriction on confidential data.

Patent Literature 1 discloses performing an access control on data based on attribute information.

CITATION LIST

Patent Literature

Patent Literature 1: JP-A-2012-003362

SUMMARY OF INVENTION

Technical Problem

In the past, data was stored in a single data management apparatus, and thus consistency of attribute information only need to be taken in a single data management apparatus. However, when data is shared among a plurality of data management apparatuses, it is necessary to perform an access control while taking consistency of attribute information managed by each data management apparatus.

An object of the present invention is to make it possible to perform an access control while taking consistency of attribute information managed by each data management apparatus when data is shared among a plurality of data management apparatuses.

Solution to Problem

An attribute linkage apparatus according to the present invention includes:

an attribute distribution section to transmit attribute information managed by each of a plurality of data management apparatuses to one of the plurality of data management apparatuses, and cause the one of the plurality of data management apparatuses to specify an access condition to data according to the transmitted attribute information and then store the data, and a condition distribution section to transmit access information in which attribute information relating to a target user out of the attribute information managed by each of the plurality of data management apparatuses has been set, and cause whether the access condition is satisfied to be determined according to the access information and an access to the data to be controlled.

Advantageous Effects of Invention

According to the present invention, attribute information managed by each data management apparatus is transmitted and an access condition is specified in the case of storing data, and access information in which attribute information relating to a target user out of attribute information managed by each data management apparatus has been set is transmitted and an access is controlled in the case of accessing to data. In this way, it is possible to perform an access control while taking consistency of attribute information managed by each data management apparatus.

BRIEF DESCRIPTION OF DRAWINGS

FIG. 5 is an explanatory diagram of information stored in a linkage information storage section 221 according to the embodiment 1.

FIG. 8 is a diagram illustrating an example of attribute information according to the embodiment 1.

FIG. 9 is an explanatory diagram of information stored in the key storage section 222 according to the embodiment 1.

FIG. 36 is a flowchart of transmission processing according to the embodiment 6.

FIG. 37 is a flowchart of reception processing according to the embodiment 6.

DESCRIPTION OF EMBODIMENTS

Embodiment 1

Figure 1:
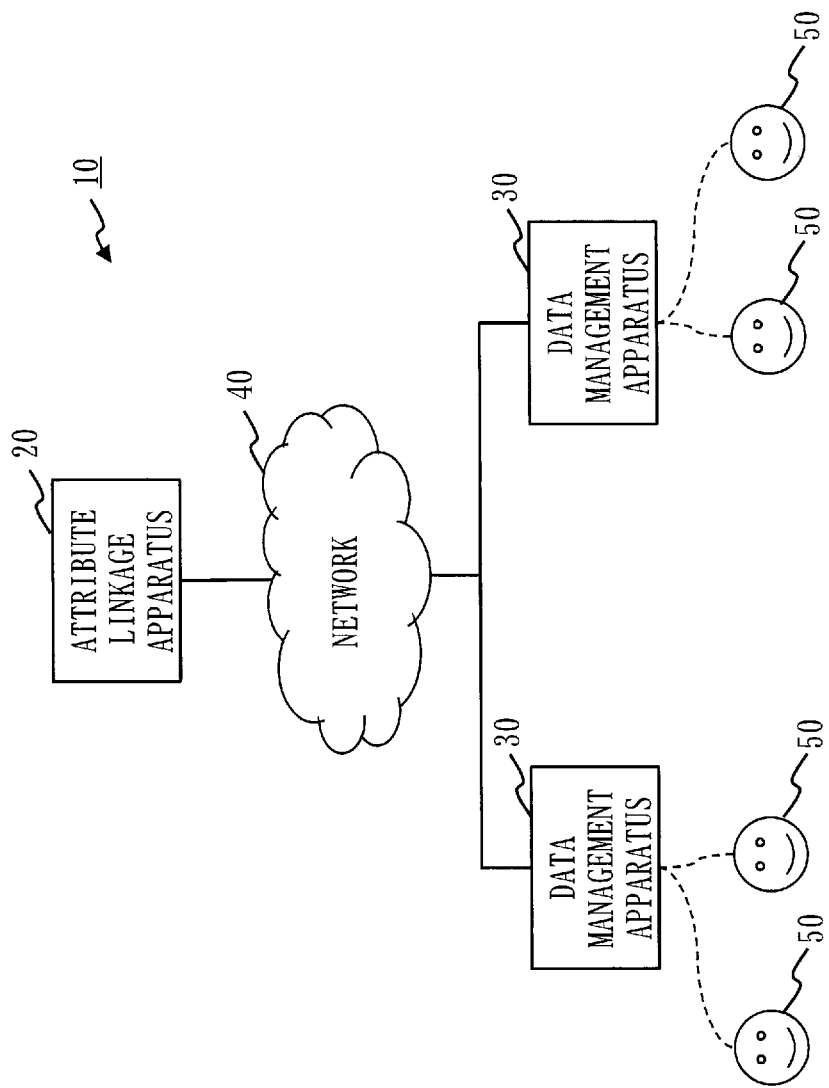
FIG. 1 is a configuration diagram of a data management system 10 according to an embodiment 1.

In the embodiment 1, an example of storing data after encrypting the data using a functional encryption will be described. The functional encryption is disclosed in WO2011/135895A1. The data is various kinds of electronic data such as document data, audio data and moving picture data.

Description of the Configuration

The configuration of a data management system 10 according to the embodiment 1 will be described with reference to FIG. 1.

The data management system 10 includes an attribute linkage apparatus 20 and a plurality of data management apparatuses 30. The attribute linkage apparatus 20 and each data management apparatus 30 are connected via a network 40.

One or more users 50 pertain to each data management apparatus 30. The user 50 accesses the data management apparatus 30 to which the user 50 pertains.

The configuration of the attribute linkage apparatus 20 according to the embodiment 1 will be described with reference to FIG. 2.

The attribute linkage apparatus 20 is a computer. In FIG. 2, the attribute linkage apparatus 20 is configured with one computer. However, the attribute linkage apparatus 20 may be configured with a plurality of computers.

The attribute linkage apparatus 20 includes hardware of a processor 21, a memory 22, and a communication interface 23. The processor 21 is connected to other hardware via a system bus and controls the other hardware.

The processor 21 is an Integrated Circuit (IC) for processing. Specific examples of the processor 21 include a CPU, a Digital Signal Processor (DSP), and a Graphics Processing Unit (GPU).

The memory 22 includes a nonvolatile memory capable of keeping execution programs and data even while the attribute linkage apparatus 20 is powered off, and a volatile memory capable of moving data at a high speed during operation of the attribute linkage apparatus 20.

Specific examples of the nonvolatile memory include a Hard Disk Drive (HDD), a Solid State Drive (SSD), and a flash memory. The nonvolatile memory may be a portable storage medium such as a Secure Digital (SD) memory card, a CompactFlash (CF), an NAND flash, a flexible disk, an optical disk, a compact disk, a Blu-ray (registered trademark) disk, and a DVD.

Specific examples of the volatile memory include a Double-Data-Rate2 Synchronous Dynamic Random Access Memory (DDR2-SDRAM) and a Double-Data-Rate3 Synchronous Dynamic Random Access Memory (DDR3-SDRAM).

The communication interface 23 is a device for communicating with other devices such as each data management apparatus 30. Specific examples of the communication interface 23 include terminals of Ethernet (registered trademark), RS232C, USB, and IEEE 1394.

The attribute linkage apparatus 20 includes a linkage management section 211, a master key generation section 212, a user management section 213, a decryption key generation section 214, an attribute distribution section 215, and a condition distribution section 216 as functional components. The functions of each section of the linkage management section 211, the master key generation section 212, the user management section 213, the decryption key generation section 214, the attribute distribution section 215, and the condition distribution section 216 are realized by software.

A program to realize the functions of each section of the attribute linkage apparatus 20 is stored in the memory 22. The program is read and executed by the processor 21. In addition, the memory 22 realizes the functions of a linkage information storage section 221 and a key storage section 222.

Figure 2:
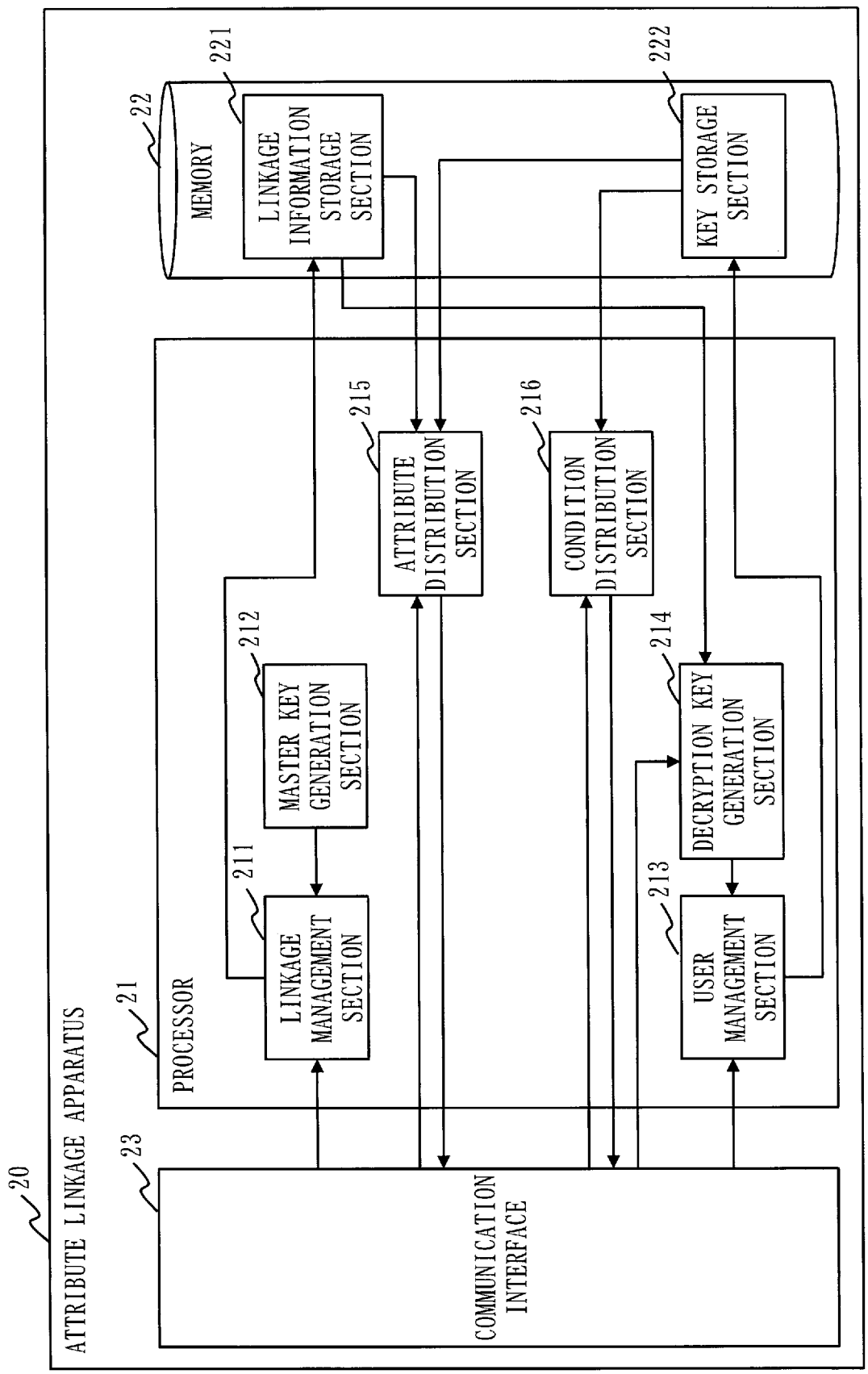
FIG. 2 is a configuration diagram of an attribute linkage apparatus 20 according to the embodiment 1.

In FIG. 2, only one processor 21 is illustrated. However, the attribute linkage apparatus 20 may include a plurality of processors replacing the processor 21. The plurality of processors shares the execution of the program for realizing the functions of each section of the attribute linkage apparatus 20. Like the processor 21, each processor is an IC for processing.

The configuration of the data management apparatus 30 according to the embodiment 1 will be described with reference to FIG. 3.

The data management apparatus 30 is a computer called cloud storage or file server. In FIG. 3, the data management apparatus 30 is configured with one computer. However, the data management apparatus 30 may be configured with a plurality of computers.

The data management apparatus 30 includes hardware of a processor 31, a memory 32, and a communication interface 33. The processor 31 is connected to other hardware via a system bus and controls the other hardware.

The processor 31 is an IC for processing. Specific examples of the processor 31 include a CPU, a DSP, and a GPU.

The memory 32 includes a nonvolatile memory capable of keeping execution programs and data even while the data management apparatus 30 is powered off, and a volatile memory capable of moving data at a high speed during operation of the data management apparatus 30.

Specific examples of the nonvolatile memory include an HDD, an SSD, and a flash memory. The nonvolatile memory may be a portable storage medium such as an SD memory card, a CF, an NAND flash, a flexible disk, an optical disk, a compact disk, a Blu-ray (registered trademark) disk, and a DVD.

Specific examples of the volatile memory include a DDR2-SDRAM and a DDR3-SDRAM.

The communication interface 33 is a device for communicating with other devices such as the attribute linkage apparatus 20. Specific examples of the communication interface 33 include terminals of Ethernet (registered trademark), RS232C, USB, and IEEE 1394.

The data management apparatus 30 includes, as functional components, a data reception section 311, a decryption condition setting section 312, an encryption key acquisition section 313, an encryption section 314, a decryption key acquisition section 315, a decryption section 316, and a data output section 317. The functions of each section of the data reception section 311, the decryption condition setting section 312, the encryption key acquisition section 313, the encryption section 314, the decryption key acquisition section 315, the decryption section 316, and the data output section 317 are realized by software.

A program to realize the functions of each section of the data management apparatus 30 is stored in the memory 32. The program is read and executed by the processor 31. In addition, the memory 32 realizes the function of a data storage section 321.

Figure 3:
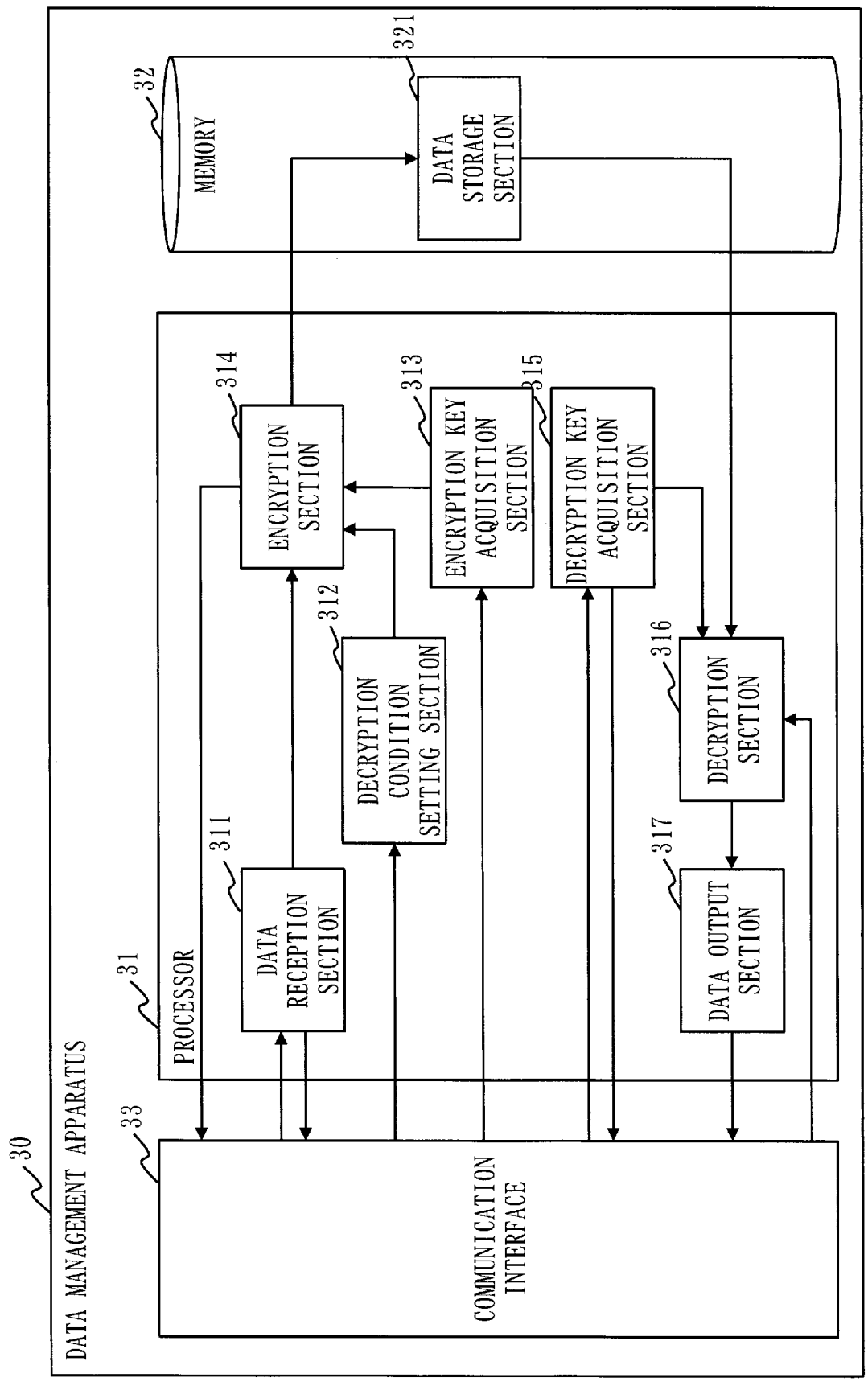
FIG. 3 is a configuration diagram of a data management apparatus 30 according to the embodiment 1.

In FIG. 3, only one processor 31 is illustrated. However, the data management apparatus 30 may include a plurality of processors replacing the processor 31. The plurality of processors shares the execution of the program for realizing the functions of each section of the data management apparatus 30. Like the processor 31, each processor is an IC for processing.

Description of Operation

The operation of the data management system 10 according to the embodiment 1 will be described with reference to FIG. 4 to FIG. 11.

The operation of the data management system 10 according to the embodiment 1 is equivalent to a data management method according to the embodiment 1. In addition, the operation of the data management system 10 according to the embodiment 1 is equivalent to the processing of a data management program according to the embodiment 1.

The operation of the data management system 10 according to the embodiment 1 includes linkage service registration processing, user registration processing, encryption processing, and decryption processing.

Linkage Service Registration Processing

The linkage service registration processing according to the embodiment 1 will be described with reference to FIG. 4.

The linkage service registration processing is executed by the attribute linkage apparatus 20. In the linkage service registration processing, a newly linked data management apparatus 30 is registered in the attribute linkage apparatus 20.

(Step S101: Linkage Information Reception Processing)

The linkage management section 211 receives linkage information input by an administrator of the data management apparatus 30 via the communication interface 23. The linkage information includes an apparatus ID for identifying the data management apparatus 30, and source information indicating an acquisition destination of attribute information in the data management apparatus 30. The apparatus ID is a pre-allocated identifier or Uniform Resource Locator (URL). As a specific example, the source information is a URL of a directory server of the data management apparatus 30.

The attribute information is information indicating the attribute of the user 50. Specific examples of the attribute information include the structure of an organization and positions. In the embodiment 1, the attribute information is expressed in a form of [attribute type]=[attribute value].

(Step S102: Domain Generation Processing)

The linkage management section 211 generates a domain corresponding to the linkage information received in step S101. Any method may be used as a method of generating a domain as long as a unique domain is generated for each data management apparatus 30.

Here, the value of a variable X is incremented every time the linkage service registration processing is executed, and the "X" of domain X is substituted for the value of the variable X to generate a domain. Therefore, domain 1, domain 2, . . . are generated in this order.

(Step S103: Linkage Information Storage Processing)

The linkage management section 211 associates the ID and the source information included in the linkage information received in step S101 with the domain generated in step S102 and writes the ID and the source information in the linkage information storage section 221. As a result, as illustrated in FIG. 5, apparatus ID and source information for each domain corresponding to the data management apparatus 30 are stored in the linkage information storage section 221.

(Step S104: Master Key Generation Processing)

The master key generation section 212 executes Setup algorithm in the functional encryption and generates a master key pair of an encryption key and a master private key for each domain. The encryption key may also be called a public parameter in the functional encryption in some cases.

Figure 6:
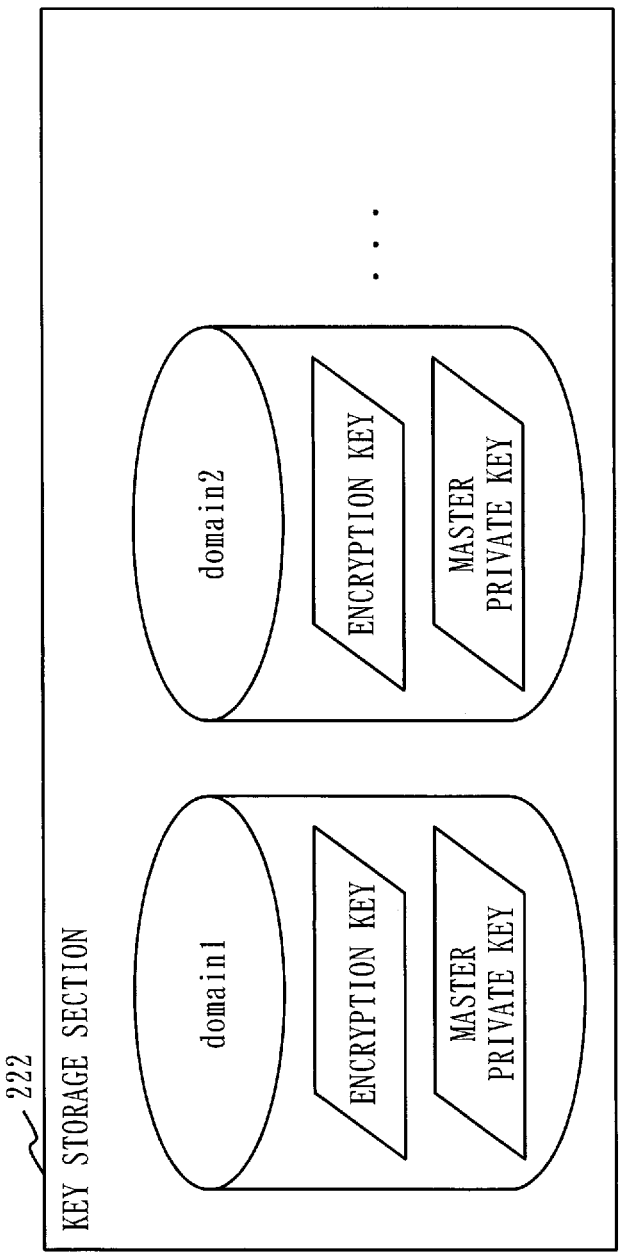
FIG. 6 is an explanatory diagram of information stored in a key storage section 222 according to the embodiment 1.

The linkage management section 211 associates the generated master key pair with the domain generated in step S102 and writes the master key pair in the key storage section 222. As a result, as illustrated in FIG. 6, a master key pair of an encryption key and a master private key for each domain corresponding to the data management apparatus 30 is stored in the key storage section 222.

User Registration Processing

The user registration processing according to the embodiment 1 will be described with reference to FIG. 7.

The user registration processing is executed by the attribute linkage apparatus 20. In the user registration processing, a user 50 newly pertaining to the data management apparatus 30 is registered in the attribute linkage apparatus 20.

(Step S201: User Information Reception Processing)

The user management section 213 receives user information input by an administrator of the data management apparatus 30 via the communication interface 23. The user information includes an apparatus ID of a data management apparatus 30 which is being used by a certain user 50, and a user ID of the user 50 in the data management apparatus 30.

(Step S202: Decryption Key Generation Processing)

The decryption key generation section 214 reads the source information corresponding to the apparatus ID included in the user information received in step S201 from the linkage information storage section 221. The decryption key generation section 214 acquires attribute information corresponding to the user ID included in the user information received in step S201 from an acquisition destination indicated by the read source information. As a specific example, the decryption key generation section 214 acquires attribute information using Lightweight Directory Access Protocol (LDAP) URL. For example, by specifying "ldap://ldap.example.com/dc=samplecloud, dc=com?department", a department attribute (attribute of the department) of an entry whose DN is dc=samplecloud, dc=com is acquired. DN stands for Distinguished Name, and dc stands for Domain-Component.

For example, assume that the attribute information illustrated in FIG. 8 has been stored in the acquisition destination indicated by the source information. Assume that "A10002" has been acquired as the user ID. Then, "ID=A10002, NAME=SATO TETSUYA, DEPARTMENT=ACCOUNTING DEPARTMENT, DIVISION=BUDGET DIVISION, POSITION=HEAD OF DIVISION" whose record number is 1 is acquired as attribute information.

The decryption key generation section 214 reads a domain corresponding to the apparatus ID included in the user information received in step S201 from the linkage information storage section 221. The decryption key generation section 214 reads a master private key corresponding to the read domain from the key storage section 222. Then the decryption key generation section 214 executes KeyGen algorithm in the functional encryption using the read master private key to generate a decryption key using the acquired attribute information as a parameter. The decryption key may also be called a user private key in the functional encryption in some cases.

Attribute information used as a parameter is set in the decryption key. In the above example, "ID=A10002, NAME=SATO TETSUYA, DEPARTMENT=ACCOUNTING DEPARTMENT, DIVISION=BUDGET DIVISION, POSITION=HEAD OF DIVISION" is set in the decryption key.

(Step S203: Decryption Key Storage Processing)

The user management section 213 associates, together with the user ID, the decryption key generated in step S202 with the domain read in step S202 and writes the decryption key in the key storage section 222. As a result, as illustrated in FIG. 9, a master key pair, and a decryption key corresponding to the user ID are stored for each domain corresponding to the data management apparatus 30 in the key storage section 222.

Encryption Processing

The encryption processing according to the embodiment 1 will be described with reference to FIG. 10.

The encryption processing is executed by the attribute linkage apparatus 20 and the target data management apparatus 30. In the encryption processing, data is encrypted and then stored.

(Step S301: Data Reception Processing)

The data reception section 311 of the target data management apparatus 30 receives an input of data to be stored from the user 50 of the data management apparatus 30 via the communication interface 33.

(Step S302: Attribute Acquisition Processing)

The data reception section 311 transmits an attribute information acquisition request to the attribute linkage apparatus 20 via the communication interface 33.

Then, the attribute distribution section 215 of the attribute linkage apparatus 20 reads all source information stored in the linkage information storage section 221. The attribute distribution section 215 acquires all attribute information from an acquisition destination indicated by each of the read source information. The attribute distribution section 215 transmits the acquired attribute information together with the domain of the acquisition destination to the target data management apparatus 30 via the communication interface 23. In this way, the data reception section 311 acquires attribute information managed by each data management apparatus 30.

(Step S303: Decryption Condition Reception Processing)

The decryption condition setting section 312 of the target data management apparatus 30 receives an input of a decryption condition in which the attribute information managed by each data management apparatus 30 and acquired in step S302 has been combined from the user 50 of the data management apparatus 30 via the communication interface 33.

As a specific example, the decryption condition setting section 312 displays the attribute type of the attribute information managed by each data management apparatus 30 in a display device, and causes a decryption condition to be input by specifying an attribute value to be set in the decryption condition for the attribute type. Like "DEPARTMENT=ACCOUNTING DEPARTMENT AND DIVISION=BUDGET DIVISION", the decryption condition is expressed in a combination of conditions of [attribute type]=[attribute value], operators such as "AND" and "OR" connecting each condition, and "( )" representing the priority of evaluation of a logical expression. "NOT" denoting negation may be used as an operator in some cases.

In a case of setting decryption conditions by combining attribute information managed by a plurality of data management apparatuses 30, for example, decryption conditions set with attribute information managed by each data management apparatus 30 are set by being combined with "OR".

(Step S304: Encryption Key Acquisition Processing)

The encryption key acquisition section 313 of the target data management apparatus 30 transmits an encryption key acquisition request including a domain of attribute information used in the decryption condition to the attribute linkage apparatus 20 via the communication interface 33.

Then, the attribute distribution section 215 of the attribute linkage apparatus 20 reads the encryption key of the domain included in the encryption key acquisition request from the key storage section 222. When a plurality of domains is included in the encryption key acquisition request, the encryption key of each domain is read. The attribute distribution section 215 transmits the read encryption key together with the domain to the target data management apparatus 30 via the communication interface 23. In this way, the encryption key acquisition section 313 acquires the encryption key of the domain of the attribute information used in the decryption condition.

(Step S305: Data Encryption Processing)

The encryption section 314 of the target data management apparatus 30 randomly generates a common key of a common key encryption method such as Advanced Encryption Standard (AES, registered trademark) and Camellia (registered trademark). The encryption section 314 encrypts the data received in step S301 with the generated common key to generate encrypted data.

(Step S306: Key Encryption Processing)

With the decryption condition received in step S303 as a parameter, the encryption section 314 of the target data management apparatus 30 encrypts the common key generated in step S305 by using the encryption key acquired in step S304 and executing Enc algorithm in the functional encryption to generate an encryption common key. In this case, when encryption keys of a plurality of domains are acquired in step S304, an encryption common key is generated for each encryption key.

Attribute information which is regarded as a parameter is embedded in the encryption common key. For example, "DEPARTMENT=ACCOUNTING DEPARTMENT AND DIVISION=BUDGET DIVISION" is set in the encryption common key. The encryption common key can be decrypted with a decryption key only when the attribute information set in the encryption common key corresponds to the attribute information set in the decryption key. In other words, by encrypting a decryption condition based on attribute information as a parameter by a functional encryption, an access condition to a common key is specified by the attribute information. Without a common key, the encrypted data cannot be decrypted, and thus an access condition to data is specified by the attribute information.

(Step S307: Ciphertext Storage Processing)

Figure 11:
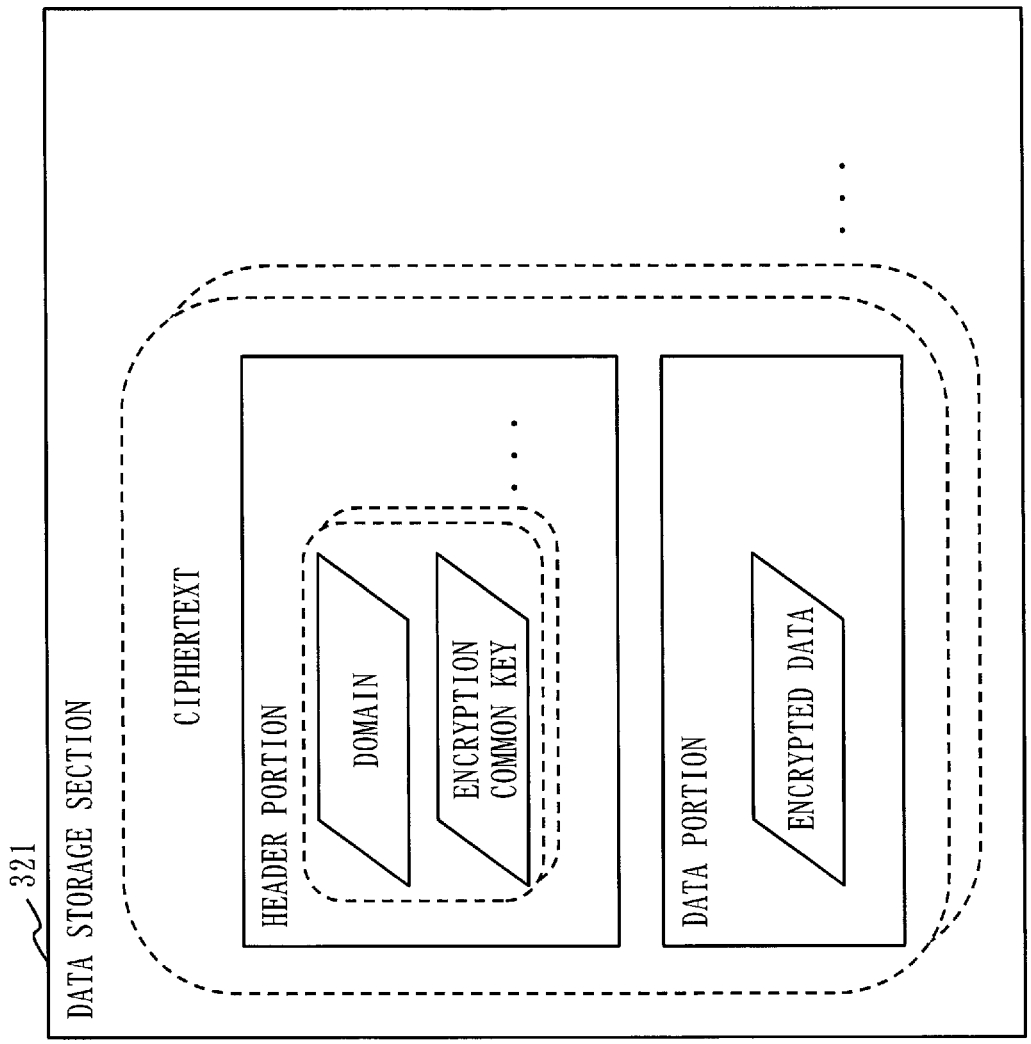
FIG. 11 is an explanatory diagram of a ciphertext according to the embodiment 1.

As illustrated in FIG. 11, the encryption section 314 of the target data management apparatus 30 writes a ciphertext, which includes a pair of a domain and the encryption common key generated in step S306 in the header portion and the encrypted data generated in step S305 in the data portion, into the data storage section 321.

Decryption Processing

The decryption processing according to the embodiment 1 will be described with reference to FIG. 12.

The decryption processing is executed by the attribute linkage apparatus 20 and the target data management apparatus 30. In the decryption processing, the stored data is read and decrypted.

As a premise of the decryption processing, a user 50 is logging in to the target data management apparatus 30. For example, the decryption processing is started after the data management apparatus 30 authenticates the user 50 by authentication with the user ID and password, biometric authentication, or authentication with an IC card. The user 50 logging in is called a target user.

(Step S401: Ciphertext Reading Processing)

The decryption section 316 of the target data management apparatus 30 receives a specification of a ciphertext from the target user via the communication interface 33. The decryption section 316 reads the specified ciphertext from the data storage section 321.

A ciphertext stored in the data storage section 321 of another data management apparatus 30 other than the target data management apparatus 30 may be specified. In this case, the decryption section 316 reads the specified ciphertext from the data storage section 321 of another data management apparatus 30 via the communication interface 33.

(Step S402: Decryption Key Acquisition Processing)

The decryption key acquisition section 315 of the target data management apparatus 30 transmits a decryption key acquisition request, which includes the domain of the target data management apparatus 30 and the user ID of the target user which is the user 50 specifying a ciphertext in step S401, to the attribute linkage apparatus 20 via the communication interface 33.

Then, the condition distribution section 216 of the attribute linkage apparatus 20 reads the decryption key corresponding to the user ID from the domain included in the decryption key acquisition request. The condition distribution section 216 transmits the read decryption key together with the domain to the target data management apparatus 30 via the communication interface 23. In this way, the decryption key acquisition section 315 acquires the decryption key corresponding to the domain included in the header portion of the ciphertext.

The condition distribution section 216 may conduct an authentication of the target user by any method, and transmit a decryption key to the target data management apparatus 30 when the target user is authenticated. For example, the condition distribution section 216 may, upon receiving a decryption key acquisition request, request a transmission of password and authenticate the target user according to a pair of the user ID and the password.

(Step S403: Key Decryption Processing)

The decryption section 316 of the target data management apparatus 30 reads the encryption common key in the same pair as the domain of the target data management apparatus 30 from the header portion of the ciphertext read in step S401. The decryption section 316 executes Dec algorithm in the functional encryption and decrypts the read encryption common key with the decryption key acquired in step S402 to generate a common key.

(Step S404: Data Decryption Processing)

The decryption section 316 of the target data management apparatus 30 reads the encrypted data from the data portion of the ciphertext read in step S401. The decryption section 316 decrypts the read encrypted data with the common key generated in step S403 to generate data.

(Step S405: Data Output Processing)

The data output section 317 of the target data management apparatus 30 outputs the data generated in step S404 via the communication interface 33.

The decryption key acquired in step S402 is access information in which attribute information relating to the target user has been set. Decrypting the encryption common key with the decryption key corresponds to determining whether an access condition set in the ciphertext is satisfied according to the access information. Then, when it is determined that the access information satisfies the access condition, the encryption common key can be decrypted by the decryption key and the common key is acquired. As a result, it is possible to decrypt the encrypted data to acquire the data.

Effects of the Embodiment 1

As described above, in the data management system 10 according to the embodiment 1, the attribute linkage apparatus 20 transmits attribute information managed by each of a plurality of data management apparatuses 30 to any one of the data management apparatus 30, and causes any one of the data management apparatus 30 to specify an access condition to data according to the attribute information and then store the data. Then the attribute linkage apparatus 20 transmits access information in which attribute information relating to a target user out of the attribute information managed by each of the plurality of data management apparatuses 30 has been set to any one of the data management apparatus 30, and causes any one of the data management apparatus 30 to determine whether the access condition is satisfied according to the access information and control an access to the data.

In this way, it is possible to perform an access control while taking consistency of attribute information managed by each data management apparatus 30.

In the data management system 10 according to the embodiment 1, a master key pair is managed for each data management apparatus 30, and a ciphertext encrypted with an encryption key of the target data management apparatus 30 which discloses data at the time of data storage is generated. Accordingly, it is possible to operate with less master key pairs and decryption keys as compared with the case of using an encryption method such as RSA encryption while preventing an access to data from being permitted to an unintended user 50 of the data management apparatus 30.

For example, assume that in a case where there is an attribute of "OCCUPATION TYPE=MANAGERIAL POSITION", "HEAD OF DIVISION" is included in the managerial position in a data management apparatus 30A while "HEAD OF DIVISION" is not included in the managerial position in another data management apparatus 30B. In this case, in a conventional data management technique, when a user 50 sets a decryption condition of "OCCUPATION TYPE=MANAGERIAL POSITION" in the data management apparatus 30B in order to share files with a user 50 having an attribute of Head of Department or higher, it could be decrypted even by a user 50 having the attribute of "HEAD OF DIVISION" in the data management apparatus 30A.

However, in the data management system 10 according to the embodiment 1, a decryption key which is access information, and a ciphertext in which an access condition has been set are generated using attribute information managed by each data management apparatus 30. Therefore, it is possible to prevent such an unintended user 50 from decrypting the ciphertext.

Other Configurations

<Variation 1>
In the embodiment 1, a ciphertext is generated using a hybrid encryption which encrypts data with a common key and encrypts the common key with a functional encryption. However, as the variation 1, the data may be encrypted with a functional encryption.

In this case, in the encryption processing, for each domain, a ciphertext in which data has been encrypted using an encryption key of that domain is generated. In addition, in this case, in the decryption processing, the ciphertext of the domain of the target data management apparatus 30 is decrypted with a decryption key and data is generated.

<Variation 2>
In the embodiment 1, the ciphertext is stored in the data storage section 321. However, as the variation 2, the ciphertext may be stored in a storage apparatus different from the data management apparatus 30.

<Variation 3>
In the embodiment 1, the functions of each section of the attribute linkage apparatus 20 and the data management apparatus 30 are realized by software. As the variation 3, the functions of each section of the attribute linkage apparatus 20 and the data management apparatus 30 may be realized by hardware. Differences of the variation 3 from the embodiment 1 will be described.

Figure 13:
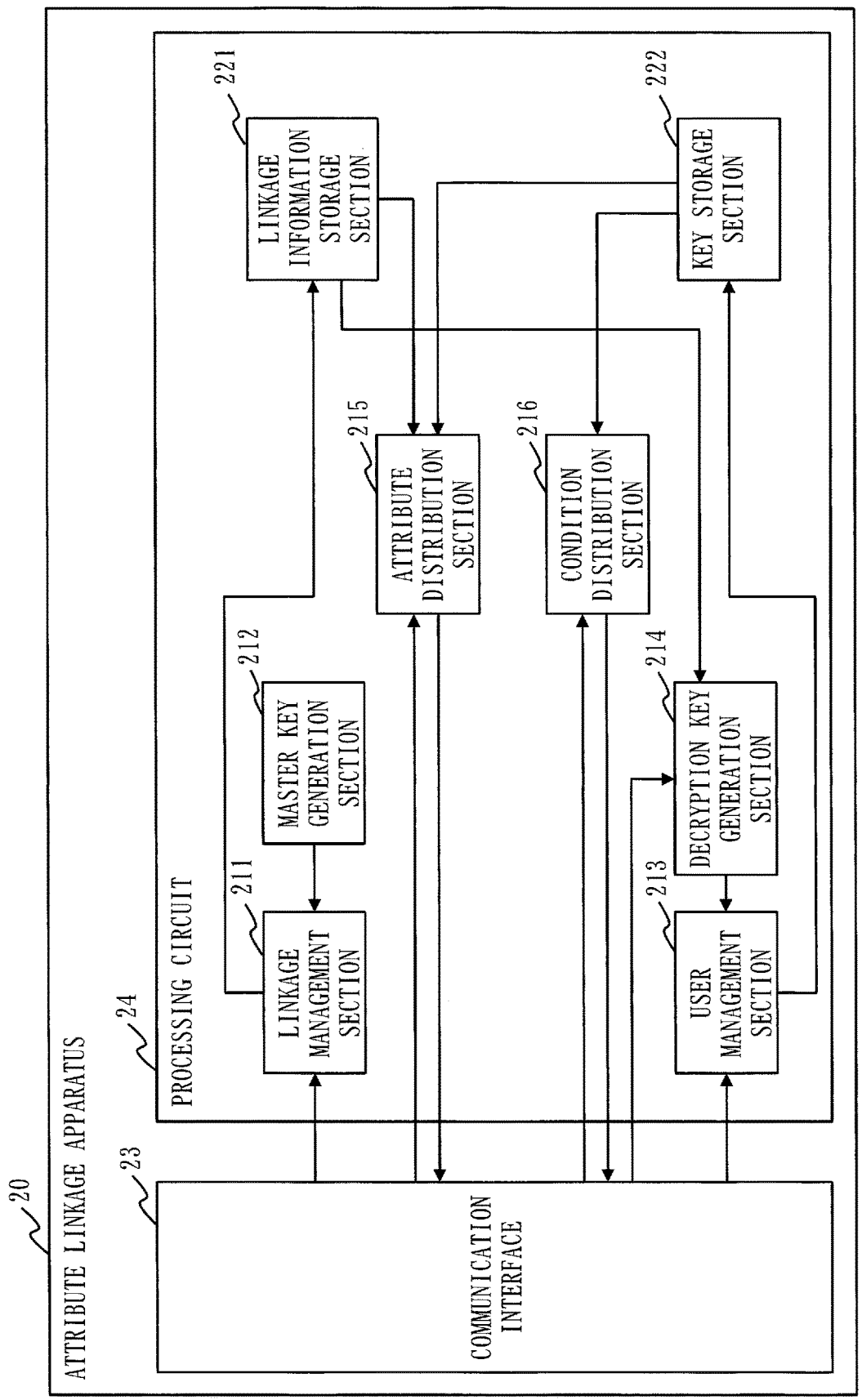
FIG. 13 is a configuration diagram of the attribute linkage apparatus 20 according to a variation 3.
Figure 14:
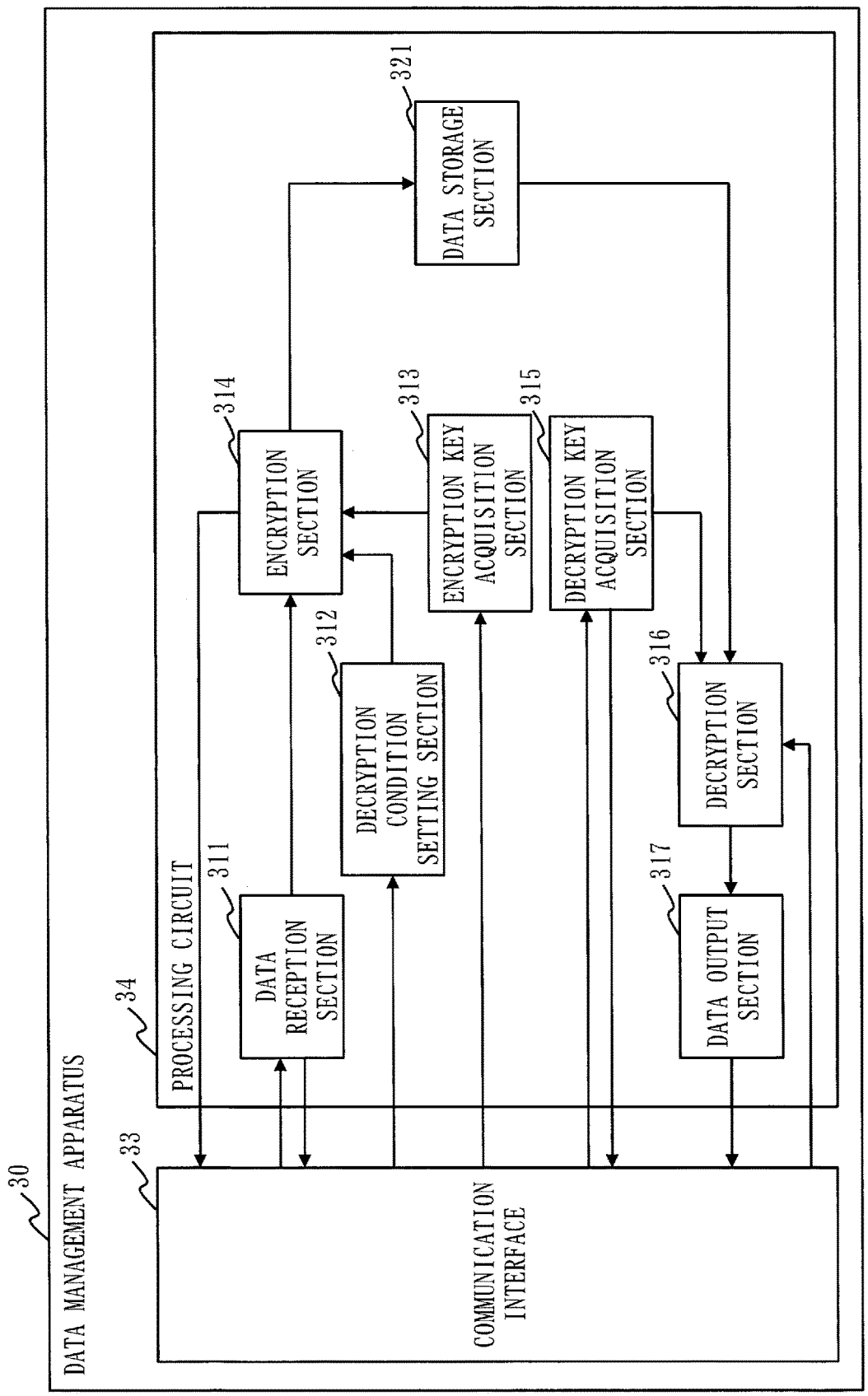
FIG. 14 is a configuration diagram of the data management apparatus 30 according to the variation 3.

The configurations of the attribute linkage apparatus 20 and the data management apparatus 30 according to the variation 3 will be described with reference to FIG. 13 and FIG. 14.

In a case where the functions of each section are realized by hardware, the attribute linkage apparatus 20 and the data management apparatus 30 are provided with processing circuits 24 and 34 instead of the processors 21 and 31, and the memories 22 and 32. The processing circuits 24 and 34 are dedicated electronic circuits for realizing the functions of each section of the attribute linkage apparatus 20 and the data management apparatus 30 and the function of the memories 22 and 32.

The processing circuits 24 and 34 may be a single circuit, a complex circuit, a programmed processor, a parallel-programmed processor, a logic IC, a Gate Array (GA), an Application Specific Integrated Circuit (ASIC), or a Field-Programmable Gate Array (FPGA).

The functions of each section may be realized by one processing circuit 24, 34, or the functions of each section may be realized by being distributed to a plurality of processing circuits 24 and 34.

<Variation 4>
As the variation 4, a part of the functions may be realized by hardware and the other functions may be realized by software. In other words, a part of the functions of each section of the attribute linkage apparatus 20 and the data management apparatus 30 may be realized by hardware and the other functions may be realized by software.

The processors 21 and 31, the memories 22 and 32, and the processing circuits 24 and 34 are collectively referred to as "processing circuitry". That is, the functions of each section are realized by the processing circuitry.

Embodiment 2

In the embodiment 1, in the user registration processing, a decryption key of the registered user is generated and stored in the key storage section 222. The embodiment 2 is different from the embodiment 1 in that a decryption key is generated when a decryption key is required in the decryption processing. In the embodiment 2, this difference will be described.

Figure 15:
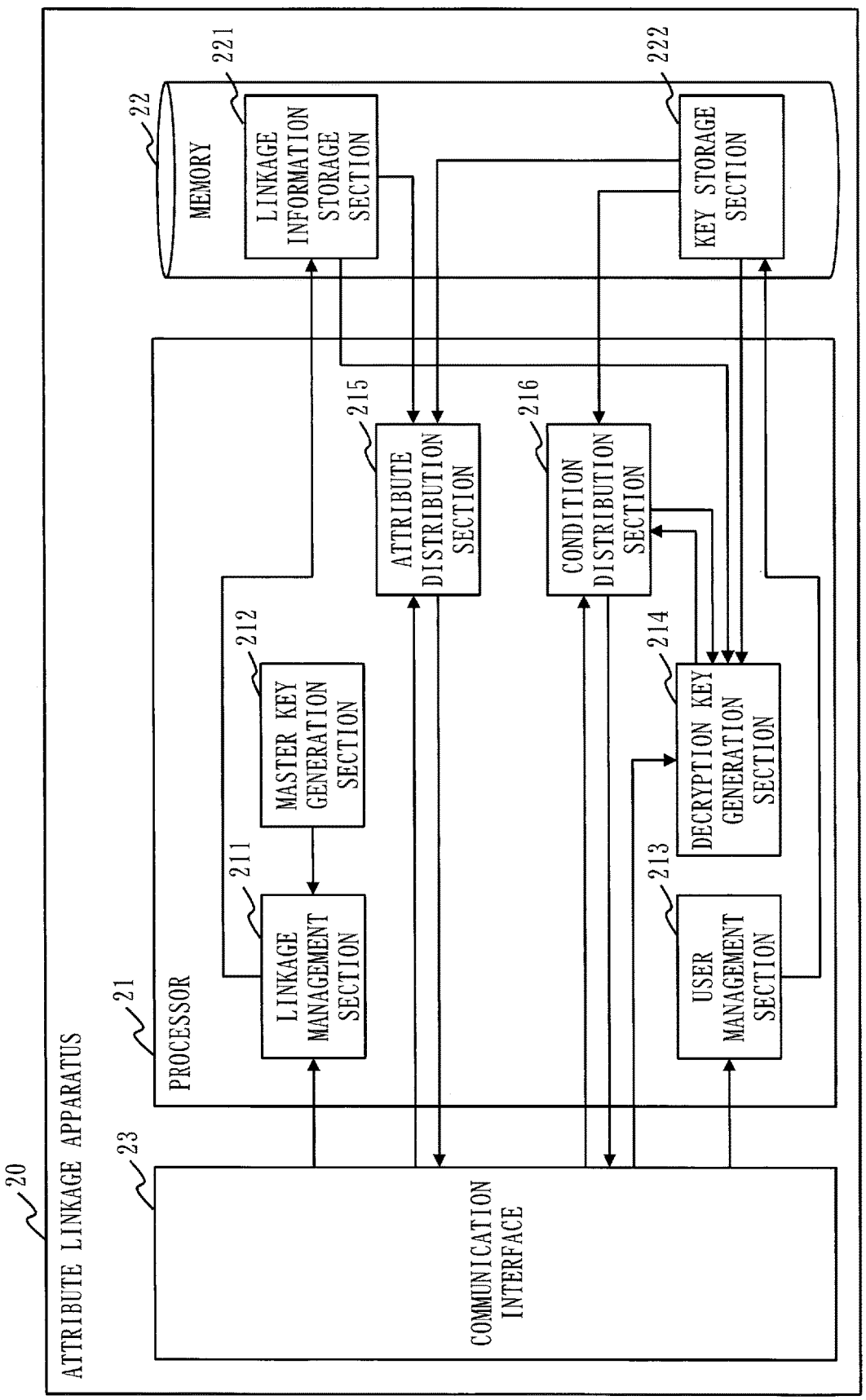
FIG. 15 is a configuration diagram of the attribute linkage apparatus 20 according to an embodiment 2.

Description of the Configuration
The configuration of the attribute linkage apparatus 20 according to the embodiment 2 will be described with reference to FIG. 15.

The configuration of the attribute linkage apparatus 20 is the same as that of the attribute linkage apparatus 20 illustrated in FIG. 2. However, the connection relations of the user management section 213 and the decryption key generation section 214 and the condition distribution section 216 are different.

Figure 16:
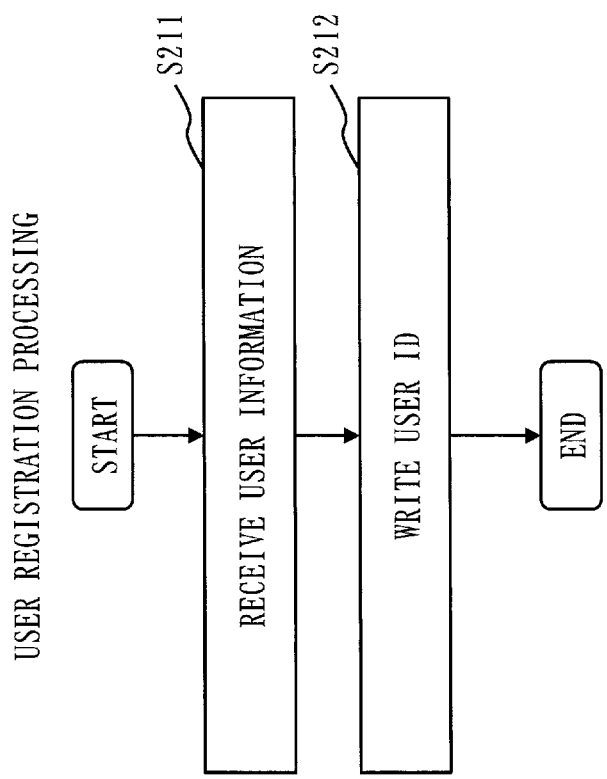
FIG. 16 is a flowchart of user registration processing according to the embodiment 2.
Figure 17:
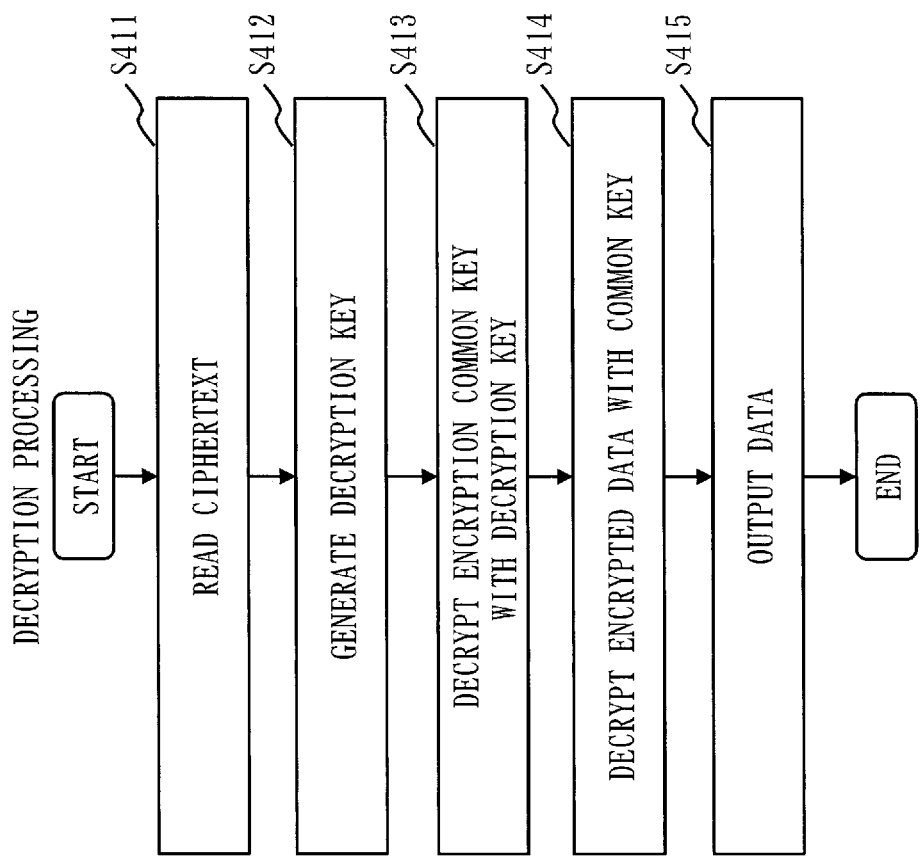
FIG. 17 is a flowchart of decryption processing according to the embodiment 2.

Description of Operation
The operation of the data management system 10 according to the embodiment 2 will be described with reference to FIG. 16 to FIG. 17.

The operation of the data management system 10 according to the embodiment 2 is equivalent to a data management method according to the embodiment 2. In addition, the operation of the data management system 10 according to the embodiment 2 is equivalent to the processing of a data management program according to the embodiment 2.

The operation of the data management system 10 according to the embodiment 2 is different from that of the embodiment 1 in the user registration processing and the decryption processing.

User Registration Processing
The user registration processing according to the embodiment 2 will be described with reference to FIG. 16.

Figure 7:
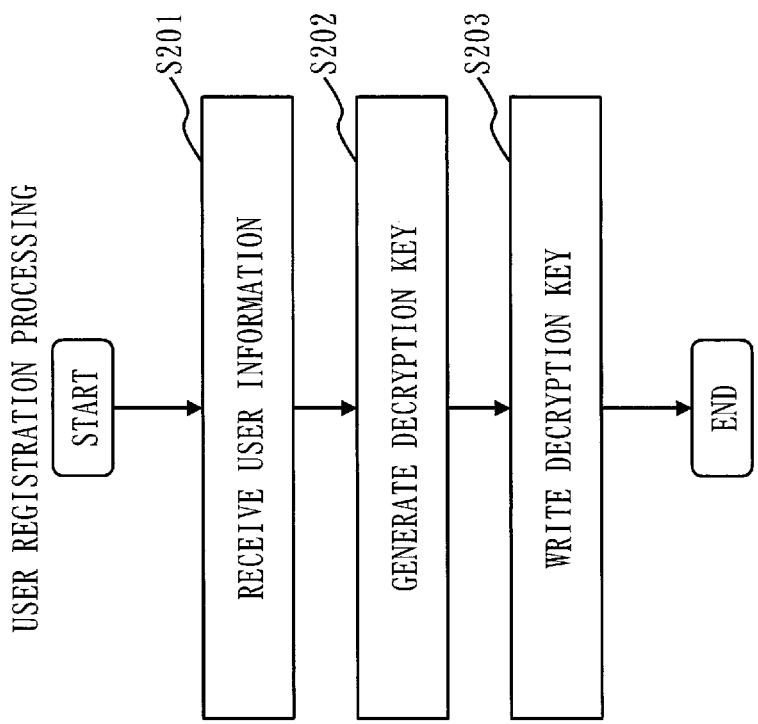
FIG. 7 is a flowchart of user registration processing according to the embodiment 1.

The processing of step S211 is the same as the processing of step S201 in FIG. 7.

(Step S212: ID Storage Processing)
The user management section 213 associates the domain corresponding to the apparatus ID included in the user information received in step S211 with the user ID included in the user information and writes the same in the key storage section 222.

Decryption Processing
The decryption processing according to the embodiment 2 will be described with reference to FIG. 17.

Figure 12:
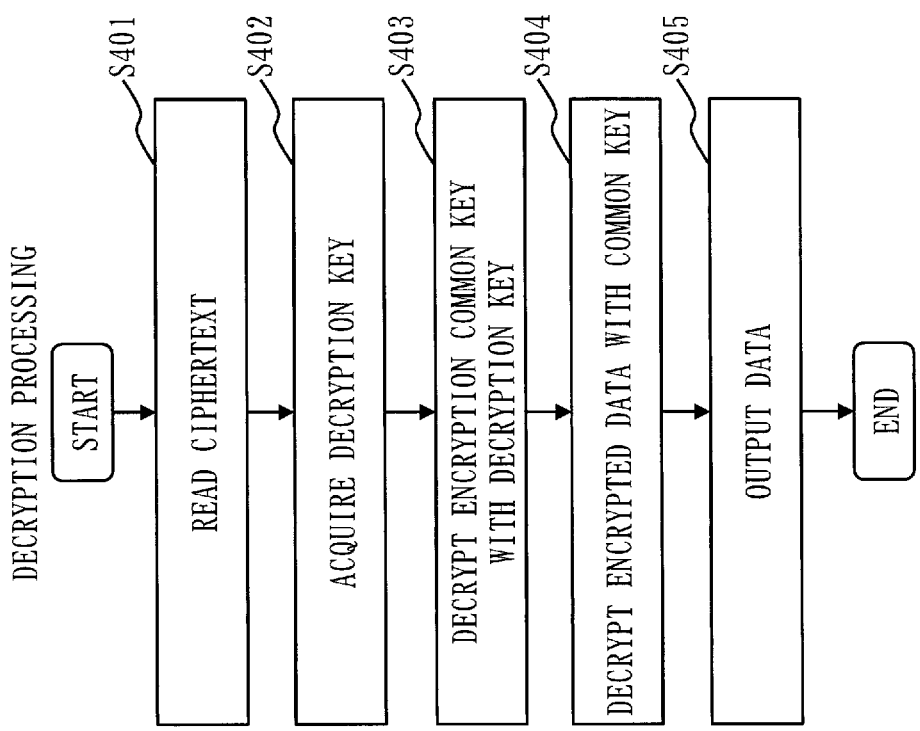
FIG. 12 is a flowchart of decryption processing according to the embodiment 1.

The processing of step S411 and the processing from step S413 to step S415 are the same as the processing of step S401 and the processing from step S403 to step S405 in FIG. 12.

(Step S412: Decryption Key Acquisition Processing)

The decryption key acquisition section 315 of the target data management apparatus 30 transmits a decryption key acquisition request, which includes the domain of the target data management apparatus 30 and the user ID of the target user which is the user 50 specifying a ciphertext in step S401, to the attribute linkage apparatus 20 via the communication interface 33.

Then, the condition distribution section 216 of the attribute linkage apparatus 20 determines whether or not the user ID included in the decryption key acquisition request is stored in the key storage section 222 by being associated with the domain included in the decryption key acquisition request. When the user ID is stored, the decryption key generation section 214 reads source information corresponding to the domain included in the decryption key acquisition request from the linkage information storage section 221. The decryption key generation section 214 acquires attribute information corresponding to the user ID included in the decryption key acquisition request from an acquisition destination indicated by the read source information. The decryption key generation section 214 reads a master private key corresponding to the domain included in the decryption key acquisition request from the key storage section 222. Then the decryption key generation section 214 executes KeyGen algorithm in the functional encryption using the read master private key to generate a decryption key with the acquired attribute information as a parameter.

The condition distribution section 216 transmits the generated decryption key together with the domain to the target data management apparatus 30 via the communication interface 23. In this way, the attribute distribution section 215 acquires the decryption key corresponding to the domain included in the header portion of the ciphertext.

Effects of the Embodiment 2

As described above, the decryption key is generated when a decryption key is required in the decryption processing in the data management system 10 according to the embodiment 2. In this way, it is possible to reduce information to be stored in the key storage section 222.

Embodiment 3

In the embodiment 1, a master key pair of an encryption key and a master private key is generated for each data management apparatus 30. The embodiment 3 is different from the embodiment 1 in that a common master key pair is generated for each data management apparatus 30. In the embodiment 3, this difference will be described.

In the embodiment 3, a case where the embodiment 1 is varied will be described. However, the same variation can be made to the embodiment 2.

Description of Operation

The operation of the data management system 10 according to the embodiment 3 will be described with reference to FIG. 18 to FIG. 22.

The operation of the data management system 10 according to the embodiment 3 is equivalent to a data management method according to the embodiment 3. In addition, the operation of the data management system 10 according to the embodiment 3 is equivalent to the processing of a data management program according to the embodiment 3.

The operation of the data management system 10 according to the embodiment 3 is different from that of the embodiment 1 in the linkage service registration processing, the user registration processing and the encryption processing.

Linkage Service Registration Processing

Figure 18:
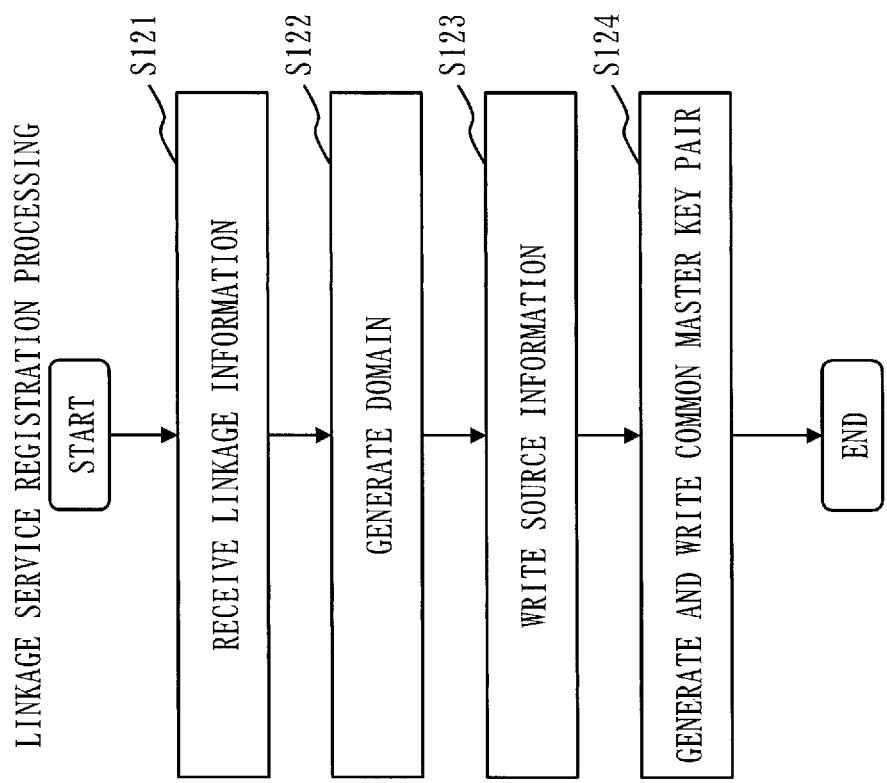
FIG. 18 is a flowchart of linkage service registration processing according to an embodiment 3.

The linkage service registration processing according to the embodiment 3 will be described with reference to FIG. 18.

Figure 4:
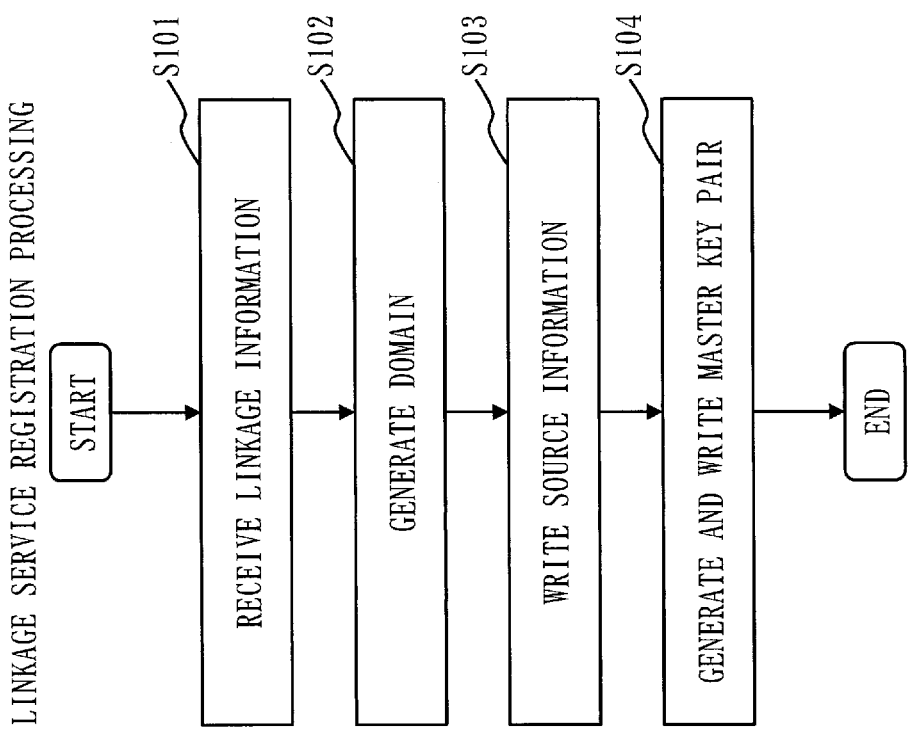
FIG. 4 is a flowchart of linkage service registration processing according to the embodiment 1.

The processing from step S121 to step S123 is the same as the processing of steps S101 to step S103 in FIG. 4.

(Step S124: Master Key Generation Processing)

The master key generation section 212 executes Setup algorithm in the functional encryption and generates a common master key pair of an encryption key and a master private key for all the data management apparatus 30.

The linkage management section 211 writes the generated master key pair in the key storage section 222.

User Registration Processing

Figure 19:
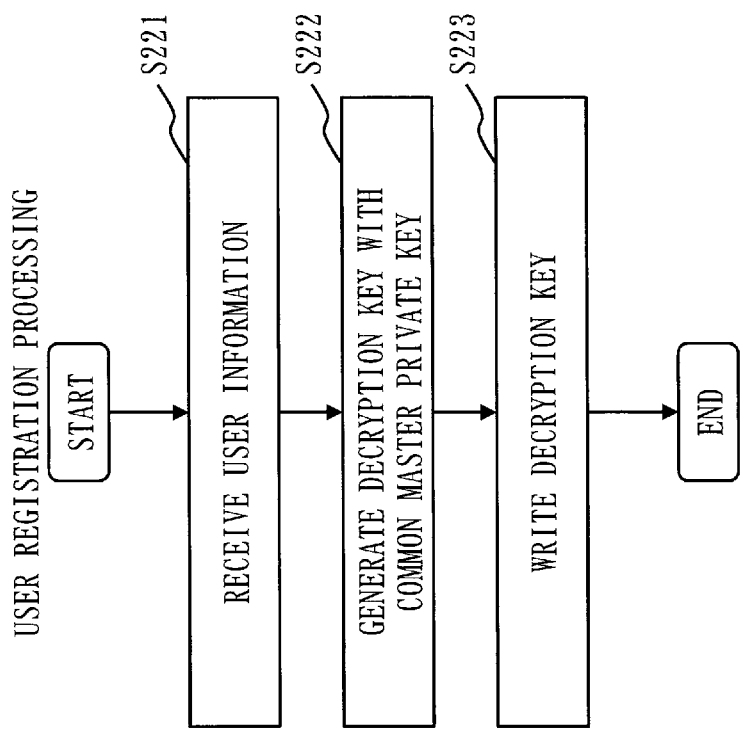
FIG. 19 is a flowchart of user registration processing according to the embodiment 3.

The user registration processing according to the embodiment 3 will be described with reference to FIG. 19.

The processing of step S221 and the processing of step S223 are the same as the processing of step S201 and the processing of step S203 in FIG. 7.

(Step S222: Decryption Key Generation Processing)

The processing of step S222 is the same as the processing of step S202 in FIG. 7 in principle. However, the processing of step S222 is different from the processing of step S202 in that in the generation of a decryption key, a common master private key is used for every domain.

Figure 20:
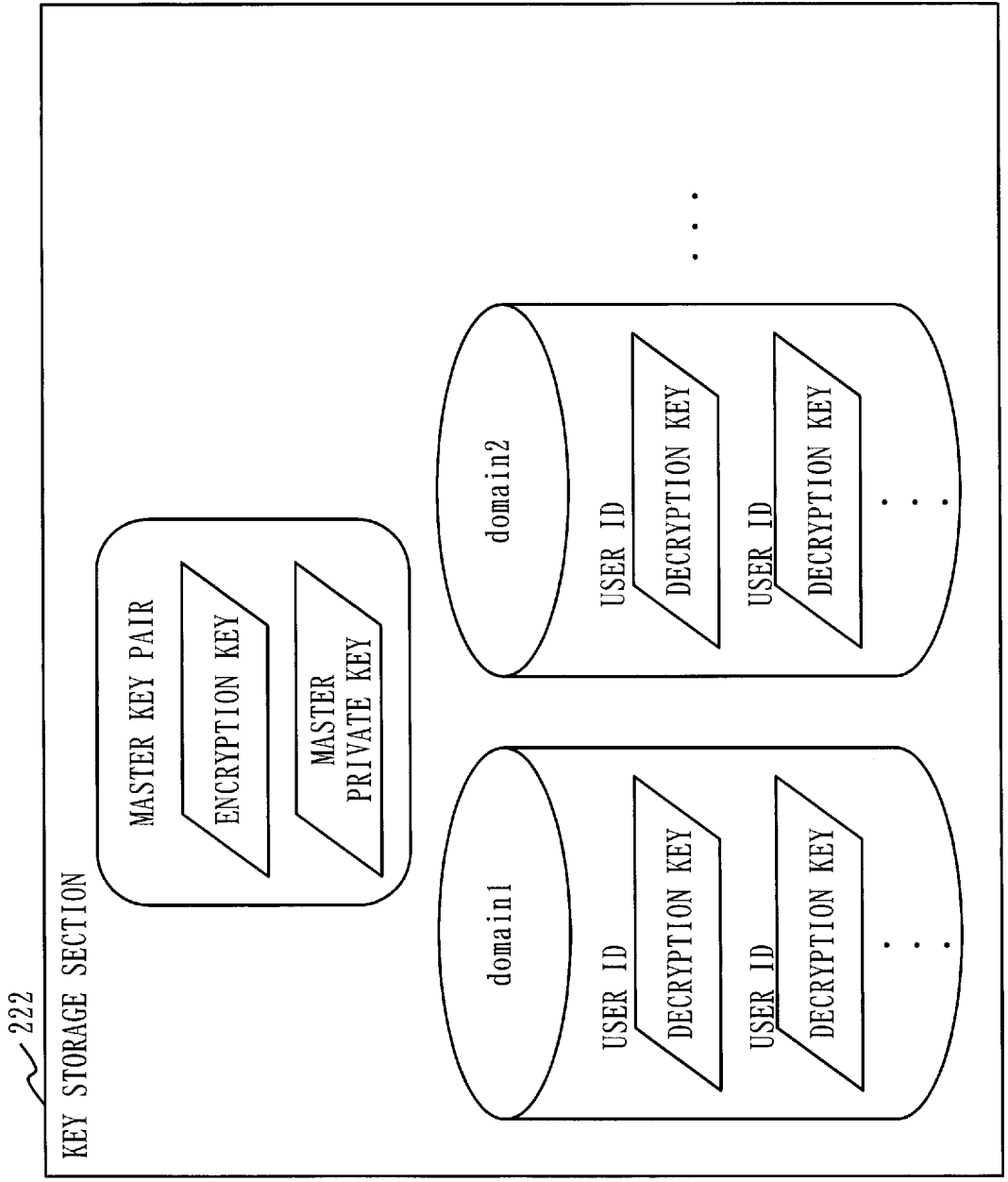
FIG. 20 is an explanatory diagram of information stored in the key storage section 222 according to the embodiment 3.

As a result, as illustrated in FIG. 20, in the processing of step S223, a common master key pair is stored, and a decryption key corresponding to a user ID is stored for every domain in the key storage section 222.

Encryption Processing

Figure 21:
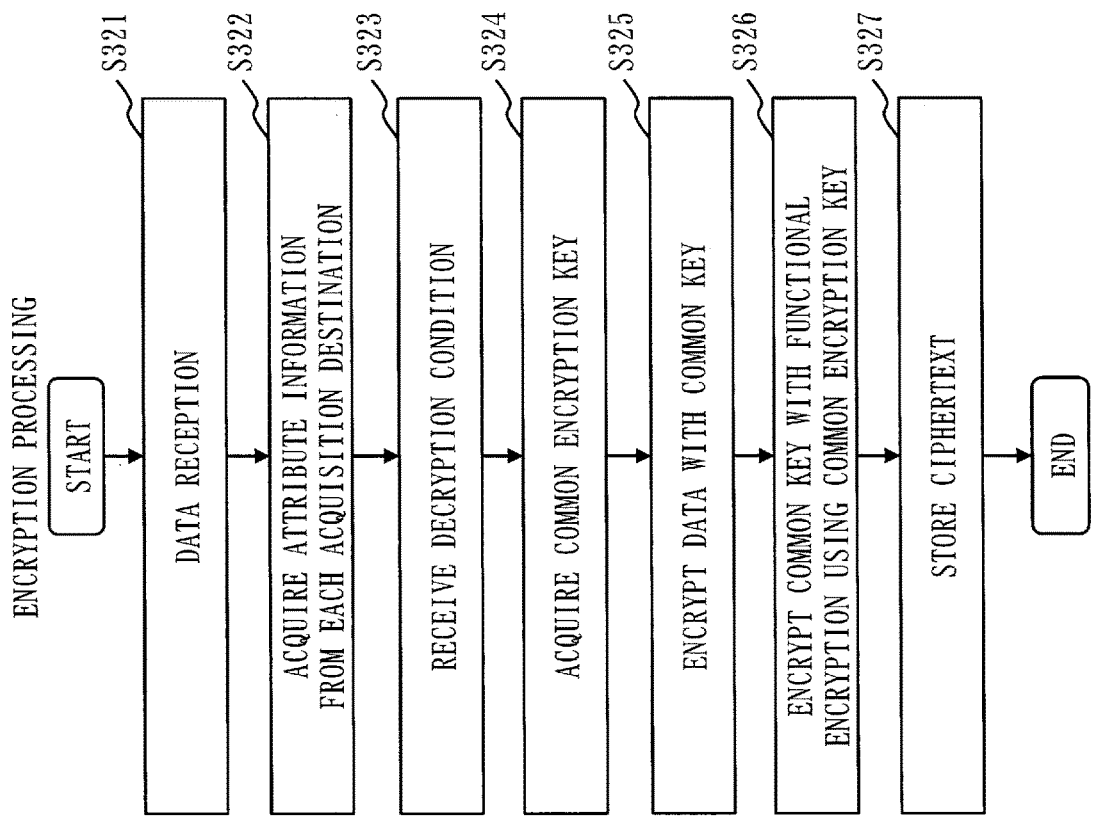
FIG. 21 is a flowchart of encryption processing according to the embodiment 3.

The encryption processing according to the embodiment 3 will be described with reference to FIG. 21.

Figure 10:
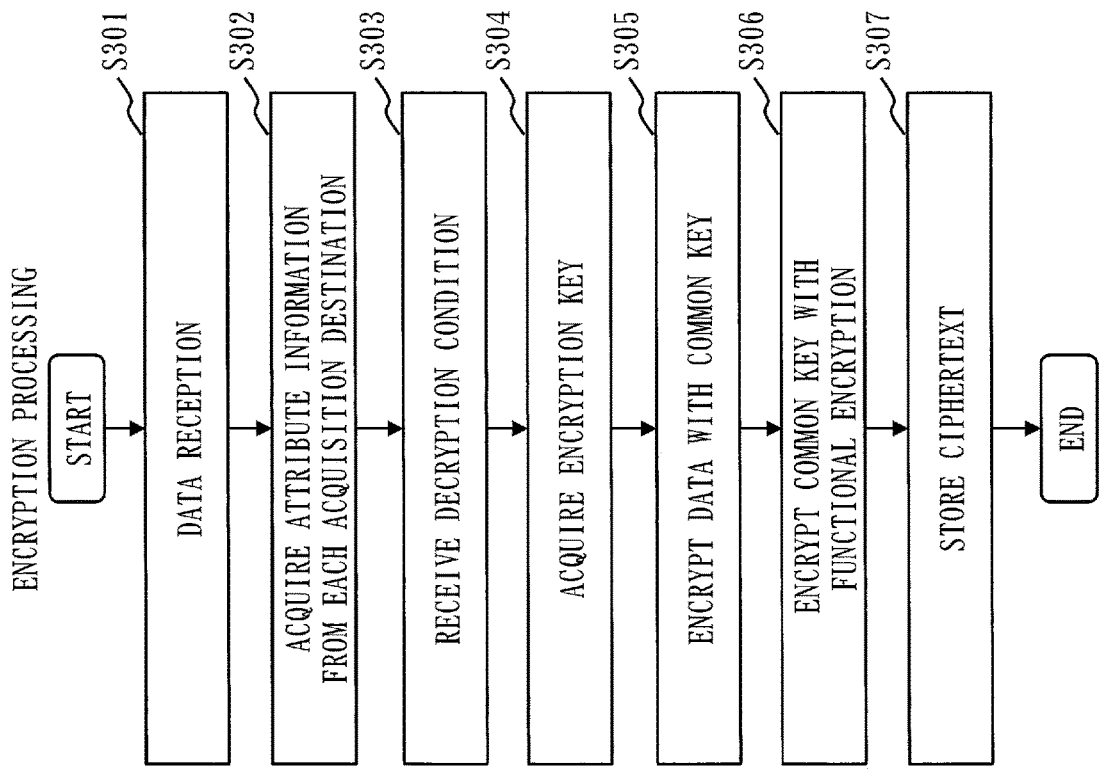
FIG. 10 is a flowchart of encryption processing according to the embodiment 1.

The processing from step S321 to step S323, the processing of step S325, and the processing of step S327 are the same as the processing from step S301 to step S303, the processing of step S305, and the processing of step S307 in FIG. 10.

(Step S324: Encryption Key Acquisition Processing)

The encryption key acquisition section 313 of the target data management apparatus 30 transmits an encryption key acquisition request to the attribute linkage apparatus 20 via the communication interface 33.

Then, the attribute distribution section 215 of the attribute linkage apparatus 20 reads the common encryption key from the key storage section 222. The attribute distribution section 215 transmits the read encryption key to the target data management apparatus 30 via the communication interface 23. In this way, the encryption key acquisition section 313 acquires the common encryption key.

(Step S326: Key Encryption Processing)

With the decryption condition received in step S323 as a parameter, the encryption section 314 of the target data management apparatus 30 encrypts the common key generated in step S325 by using the common encryption key acquired in step S324 and executing Enc algorithm in the functional encryption to generate an encryption common key.

Figure 22:
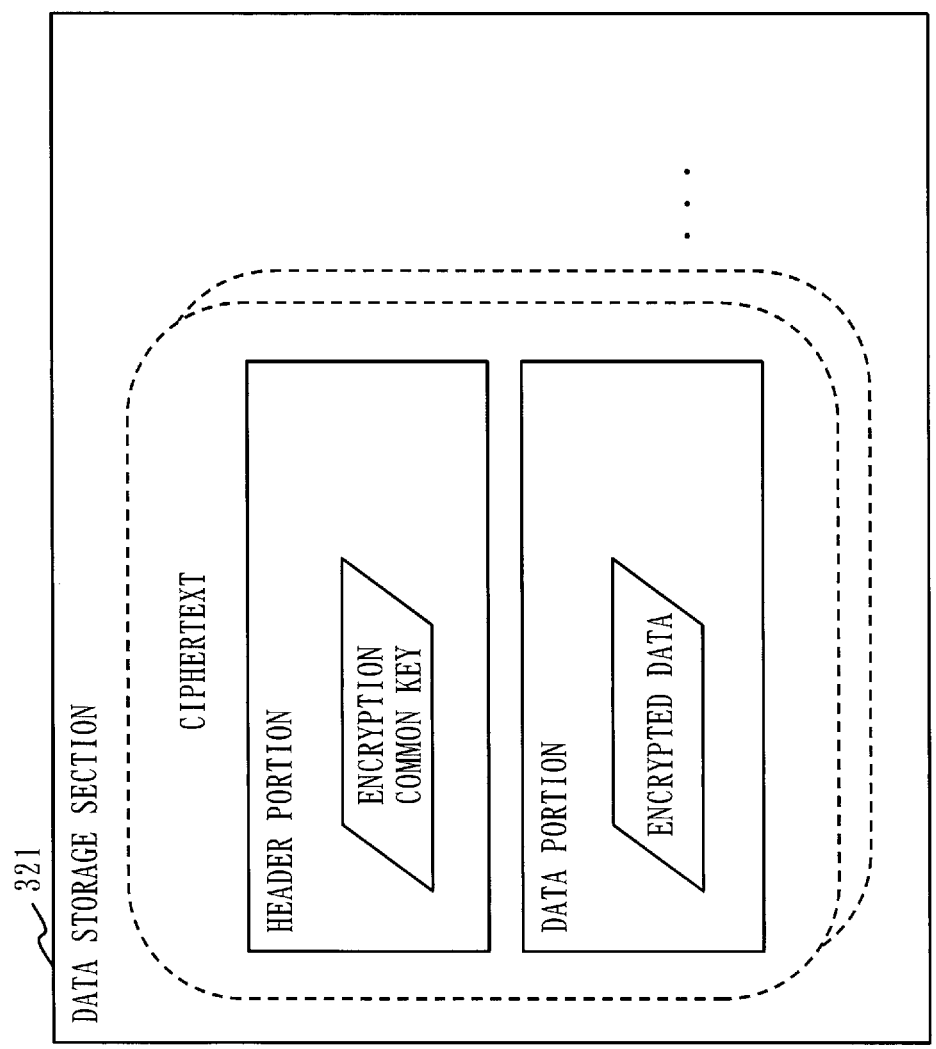
FIG. 22 is an explanatory diagram of information stored in a data storage section 321 according to the embodiment 3.

As a result, as illustrated in FIG. 22, a ciphertext including an encryption common key shared by each domain in the header portion and including encrypted data in the data portion is stored into the data storage section 321 in the processing of step S327.

Effects of the Embodiment 3

As described above, a common master key pair is used in the data management system 10 according to the embodiment 3. In this way, it is possible to reduce information to be stored in the key storage section 222. In addition, the header portion of the ciphertext only includes one encryption common key. Therefore, it is possible to reduce information to be stored in the data storage section 321.

Embodiment 4

In the embodiment 4, a transfer system 11 which applies the data management system 10 described in the embodiments 1 to 3 and transfers data from a transmission apparatus 60 which is a data management apparatus 30 to a reception apparatus 70 which is another data management apparatus 30 will be described.

In the embodiment 4, the transfer system 11 to which the data management system 10 described in the embodiment 1 is applied will be described. However, it is also possible to configure the transfer system by applying the data management system 10 described in the embodiments 2 and 3 in the same manner.

In the embodiment 4, differences from the embodiment 1 will be described.

In the embodiment 4, as described in the variation 2, description will be made to that the ciphertext is not stored in the data storage section 321 of the data management apparatus 30 but is stored in a storage apparatus 80 different from the data management apparatus 30.

Description of the Configuration

Figure 23:
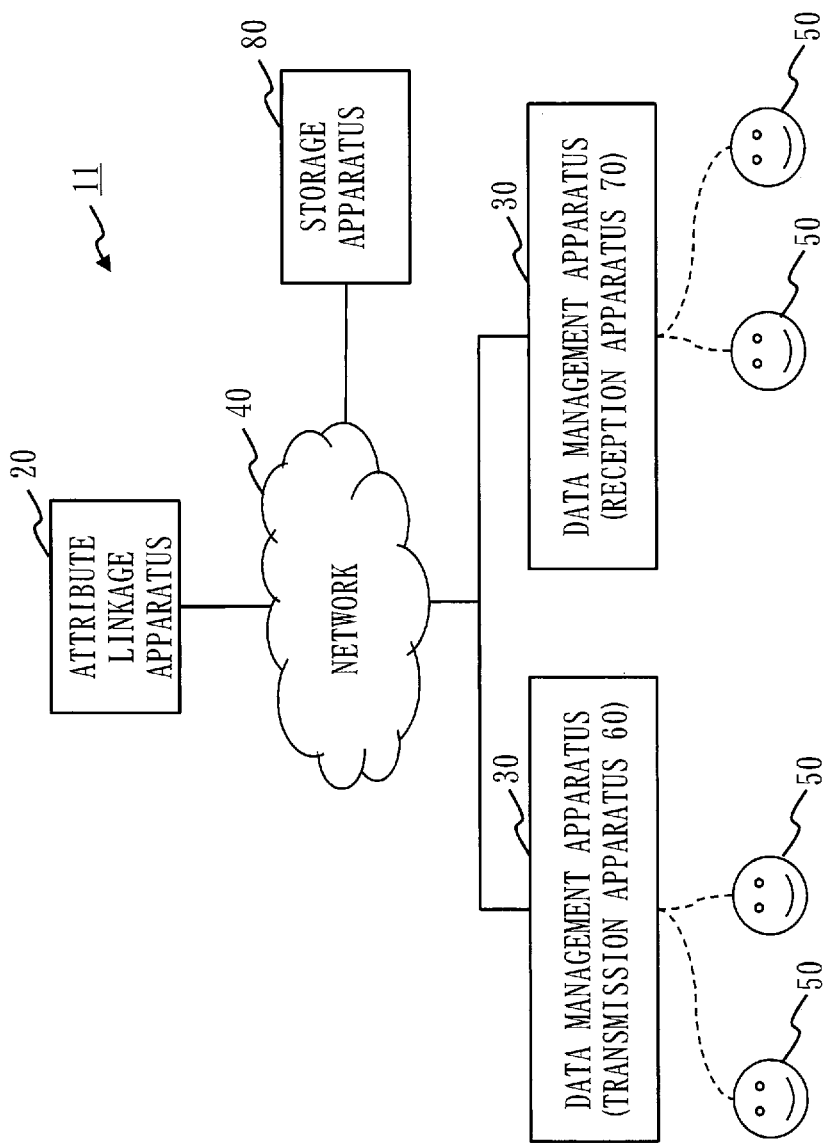
FIG. 23 is a configuration diagram of a transfer system 11 according to an embodiment 4.

The configuration of the transfer system 11 according to the embodiment 4 will be described with reference to FIG. 23.

The transfer system 11 includes the attribute linkage apparatus 20, a plurality of data management apparatuses 30, and the storage apparatus 80. The attribute linkage apparatus 20 and each data management apparatus 30 and the storage apparatus 80 are connected via the network 40.

Here, a data management apparatus 30 is the transmission apparatus 60, and the other data management apparatus 30 is the reception apparatus 70. The transmission apparatus 60 is an apparatus that transmits data, and the reception apparatus 70 is the apparatus that receives data. In the following description, the user 50 of the transmission apparatus 60 is called a transmission user, and the user 50 of the reception apparatus 70 is called a reception user.

Description of Operation

Figure 24:
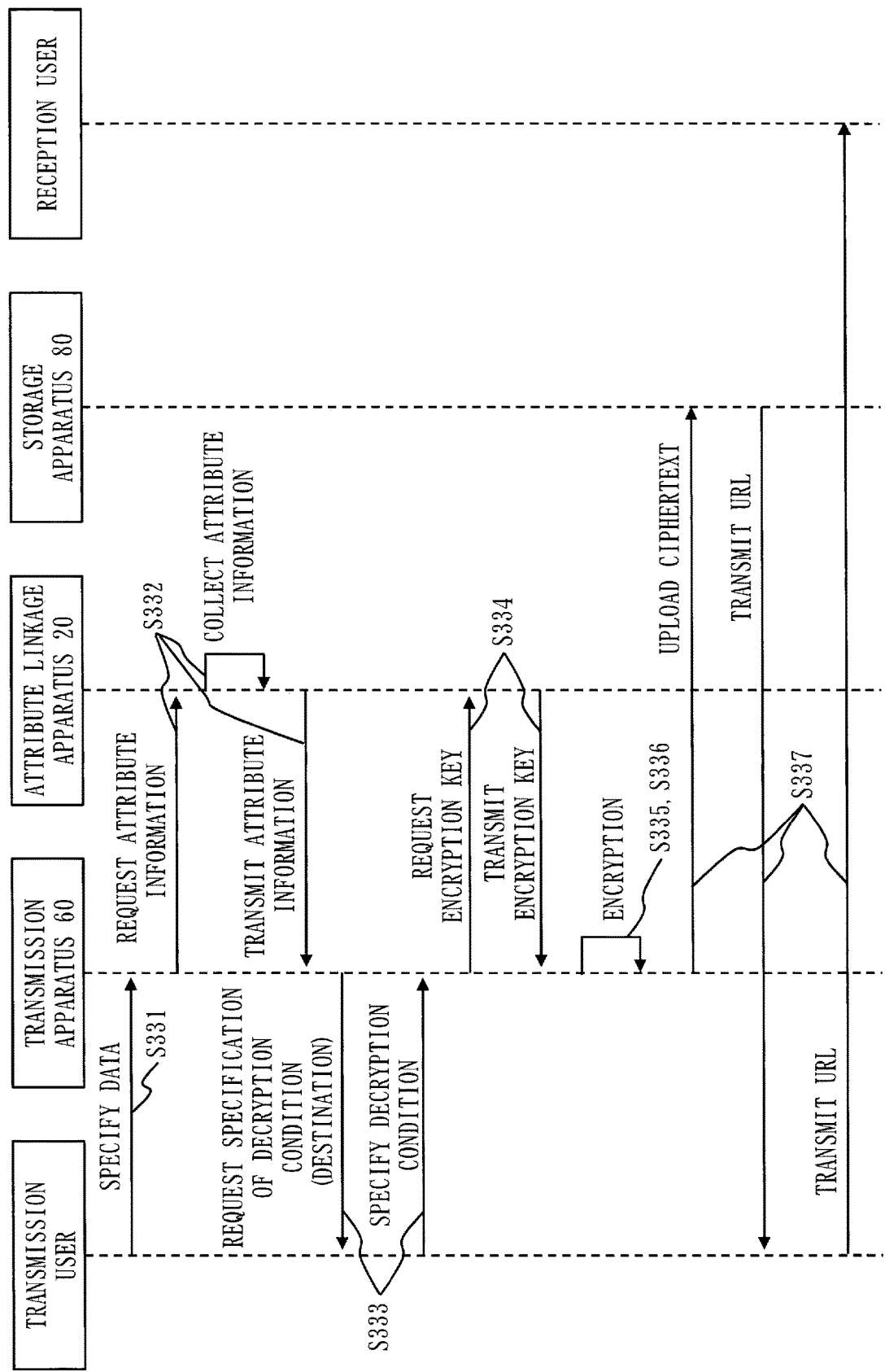
FIG. 24 is a flowchart of transmission processing according to the embodiment 4.
Figure 25:
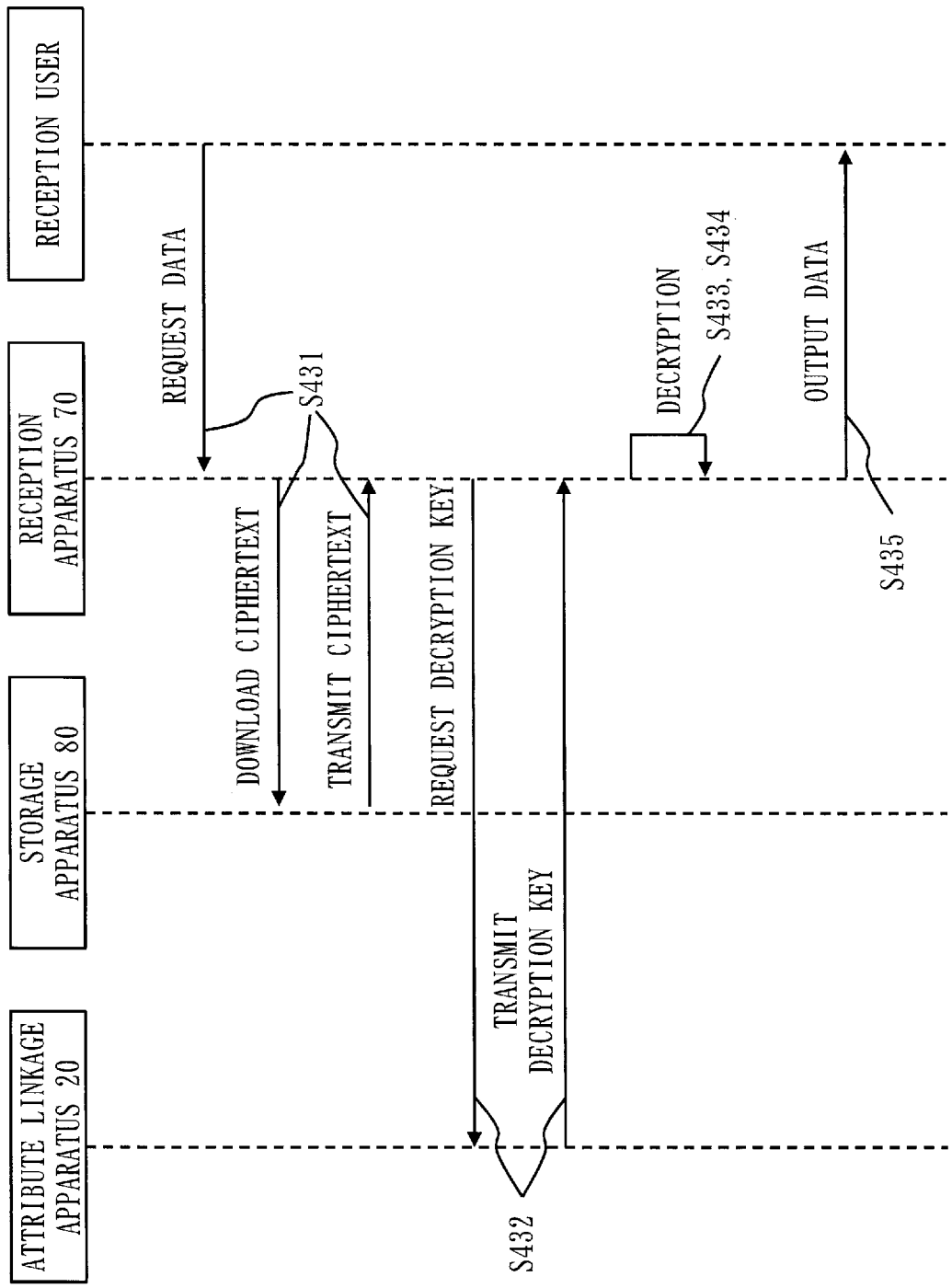
FIG. 25 is a flowchart of reception processing according to the embodiment 4.

The operation of the transfer system 11 according to the embodiment 4 will be described with reference to FIG. 24 to FIG. 25.

The operation of the transfer system 11 according to the embodiment 4 is equivalent to a transfer method according to the embodiment 4. In addition, the operation of the transfer system 11 according to the embodiment 4 is equivalent to the processing of a transfer program according to the embodiment 4.

The operation of the transfer system 11 according to the embodiment 4 includes linkage service registration processing, user registration processing, transmission processing, and reception processing. The linkage service registration processing and the user registration processing are the same as those in the embodiment 1.

Transmission Processing

The transmission processing according to the embodiment 4 will be described with reference to FIG. 24.

The transmission processing is executed by the transmission apparatus 60. In the transmission processing, data is transmitted from the transmission user of the transmission apparatus 60 to the reception user of the reception apparatus 70.

The processing from step S331 to step S336 is the same as the processing from step S301 to step S306 in FIG. 10. In step S333, as a decryption condition, the attribute of the reception user as the destination of the ciphertext is specified.

(Step S337: Ciphertext Storage Processing)

As illustrated in FIG. 11, the encryption section 314 of the transmission apparatus 60 uploads a ciphertext, which includes a pair of the encryption common key generated in step S306 and a domain in the header portion and the encrypted data generated in step S305 in the data portion, to the storage apparatus 80 via the communication interface 33.

Then, a URL indicating the location where the ciphertext has been stored is transmitted from the storage apparatus 80 to the transmission apparatus 60. The encryption section 314 transmits the transmitted URL to the reception user of the reception apparatus 70. As a specific example, the encryption section 314 transmits an e-mail indicating the URL to the reception user of the reception apparatus 70.

Reception Processing

The reception processing according to the embodiment 4 will be described with reference to FIG. 25.

The reception processing is executed by the reception apparatus 70. In the reception processing, the reception user of the reception apparatus 70 receives data transmitted from the transmission user of the transmission apparatus 60.

The processing from step S432 to step S435 is the same as the processing from step S402 to step S405 in FIG. 12.

(Step S431: Ciphertext Reading Processing)

The decryption section 316 of the target data management apparatus 30 receives a specification of ciphertext from the reception user via the communication interface 33. Here, a ciphertext is specified by indicating the URL transmitted in step S337. The decryption section 316 downloads the specified ciphertext from the storage apparatus 80.

In step S432, the decryption key may be transmitted after the reception user is authenticated using information such as a Media Access Control (MAC) address of a sender of the URL or an Internet Protocol (IP) address, or a client certificate in a case of using a Secure Sockets Layer (SSL).

Effects of the Embodiment 4

As described above, in the transfer system 11 according to the embodiment 4, data can be transferred from the transmission user of the transmission apparatus 60 to the reception user of the reception apparatus 70. In particular, even when attribute information is separately managed by the transmission apparatus 60 and the reception apparatus 70, it is still possible to transfer data after realizing an appropriate access control.

Embodiment 5

In the embodiment 1, access control was performed using a functional encryption. The embodiment 5 is different from the embodiment 1 in that access control is performed without using an encryption such as a functional encryption. This difference will be described in the embodiment 5.

Description of the Configuration

Figure 26:
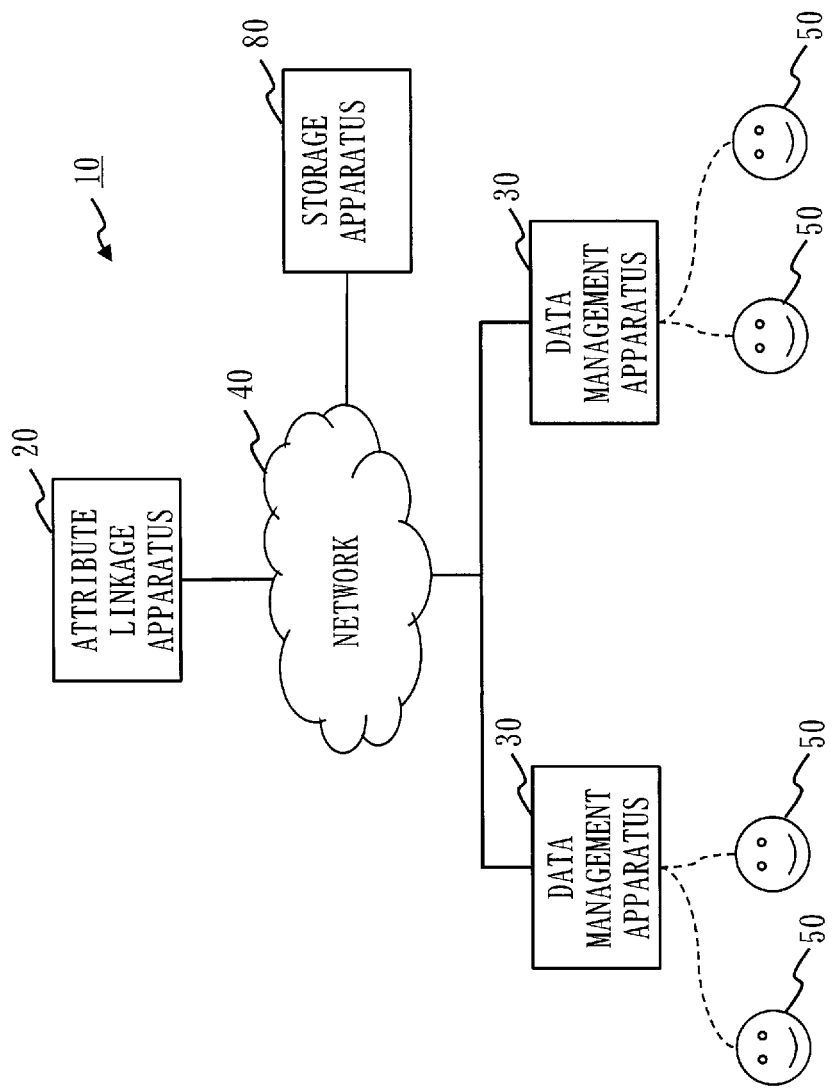
FIG. 26 is a configuration diagram of the data management system 10 according to an embodiment 5.

The configuration of the data management system 10 according to the embodiment 5 will be described with reference to FIG. 26.

The data management system 10 is different from the data management system 10 illustrated in FIG. 1 in that it has a storage apparatus 80.

The storage apparatus 80 is connected to the attribute linkage apparatus 20 and each data management apparatus 30 via the network 40.

The configuration of the storage apparatus 80 according to the embodiment 5 will be described with reference to FIG. 27.

The storage apparatus 80 is a computer that stores data managed by each data management apparatus 30. In FIG. 27, the storage apparatus 80 is configured with one computer. However, the storage apparatus 80 may be configured with a plurality of computers.

The storage apparatus 80 includes hardware of a processor 81, a memory 82, and a communication interface 83. The processor 81 is connected to other hardware via a system bus and controls the other hardware.

The processor 81 is an IC for processing. Specific examples of the processor 81 include a CPU, a DSP, and a GPU.

The memory 82 includes a nonvolatile memory capable of keeping execution programs and data even while the storage apparatus 80 is powered off, and a volatile memory capable of moving data at a high speed during operation of the storage apparatus 80.

Specific examples of the nonvolatile memory include an HDD, an SSD, and a flash memory. The nonvolatile memory may be a portable storage medium such as an SD memory card, a CF, an NAND flash, a flexible disk, an optical disk, a compact disk, a Blu-ray (registered trademark) disk, and a DVD.

Specific examples of the volatile memory include a DDR2-SDRAM and a DDR3-SDRAM.

The communication interface 83 is a device for communicating with each data management apparatus 30. Specific examples of the communication interface 33 include terminals of Ethernet, RS232C, USB, and IEEE 1394.

The storage apparatus 80 includes, as functional components, a data reception section 811, a request reception section 812, an access determination section 813, an access information acquisition section 814, and a data output section 815. The functions of each section of the data reception section 811, the request reception section 812, the access determination section 813, the access information acquisition section 814, and the data output section 815 are realized by software.

A program to realize the functions of each section of the storage apparatus 80 is stored in the memory 82. The program is read and executed by the processor 81. In addition, the memory 82 realizes the function of a data storage section 821.

Figure 27:
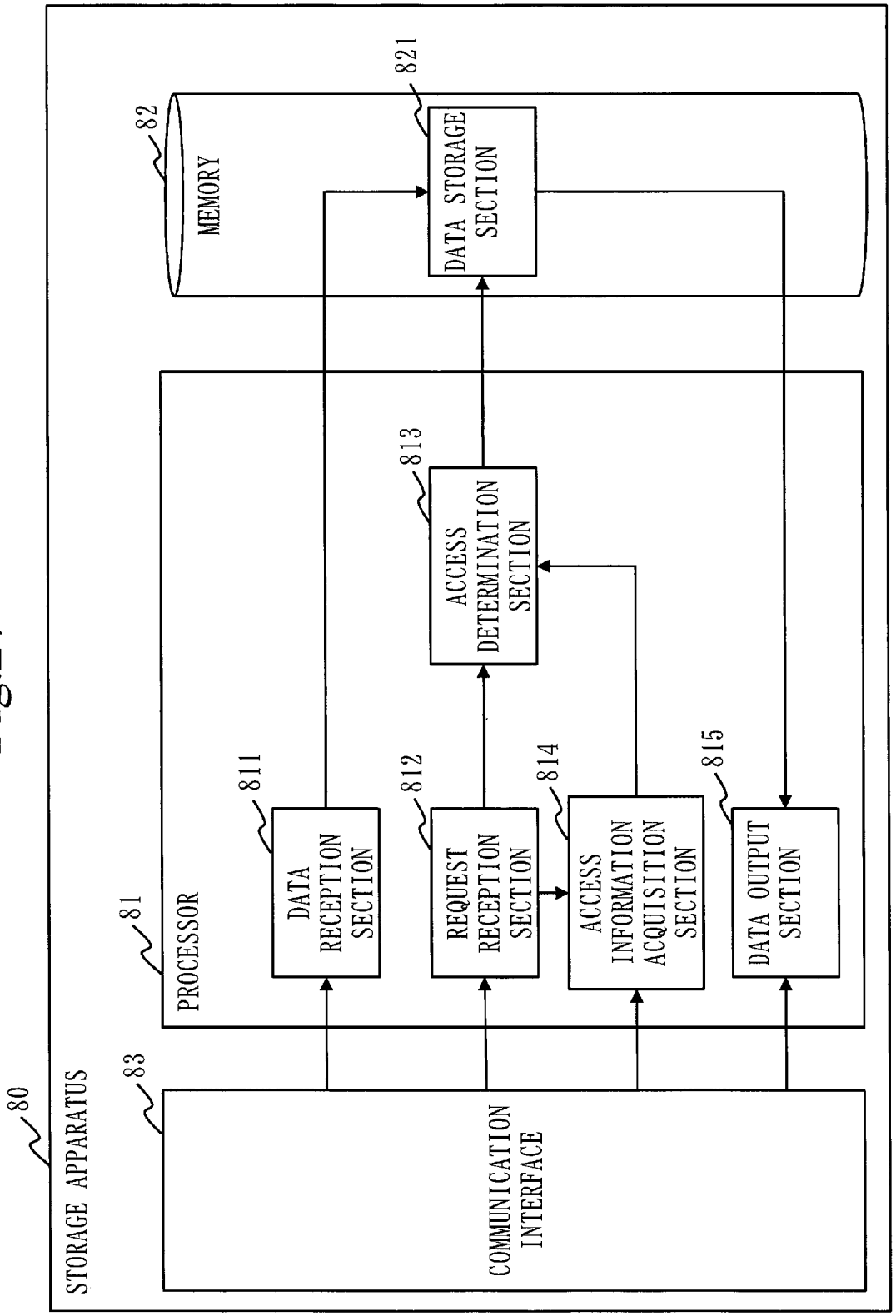
FIG. 27 is a configuration diagram of a storage apparatus 80 according to the embodiment 5.

In FIG. 27, only one processor 81 is illustrated. However, the storage apparatus 80 may include a plurality of processors replacing the processor 81. The plurality of processors shares the execution of the program for realizing the functions of each section of the storage apparatus 80. Like the processor 81, each processor is an IC for processing.

Figure 28:
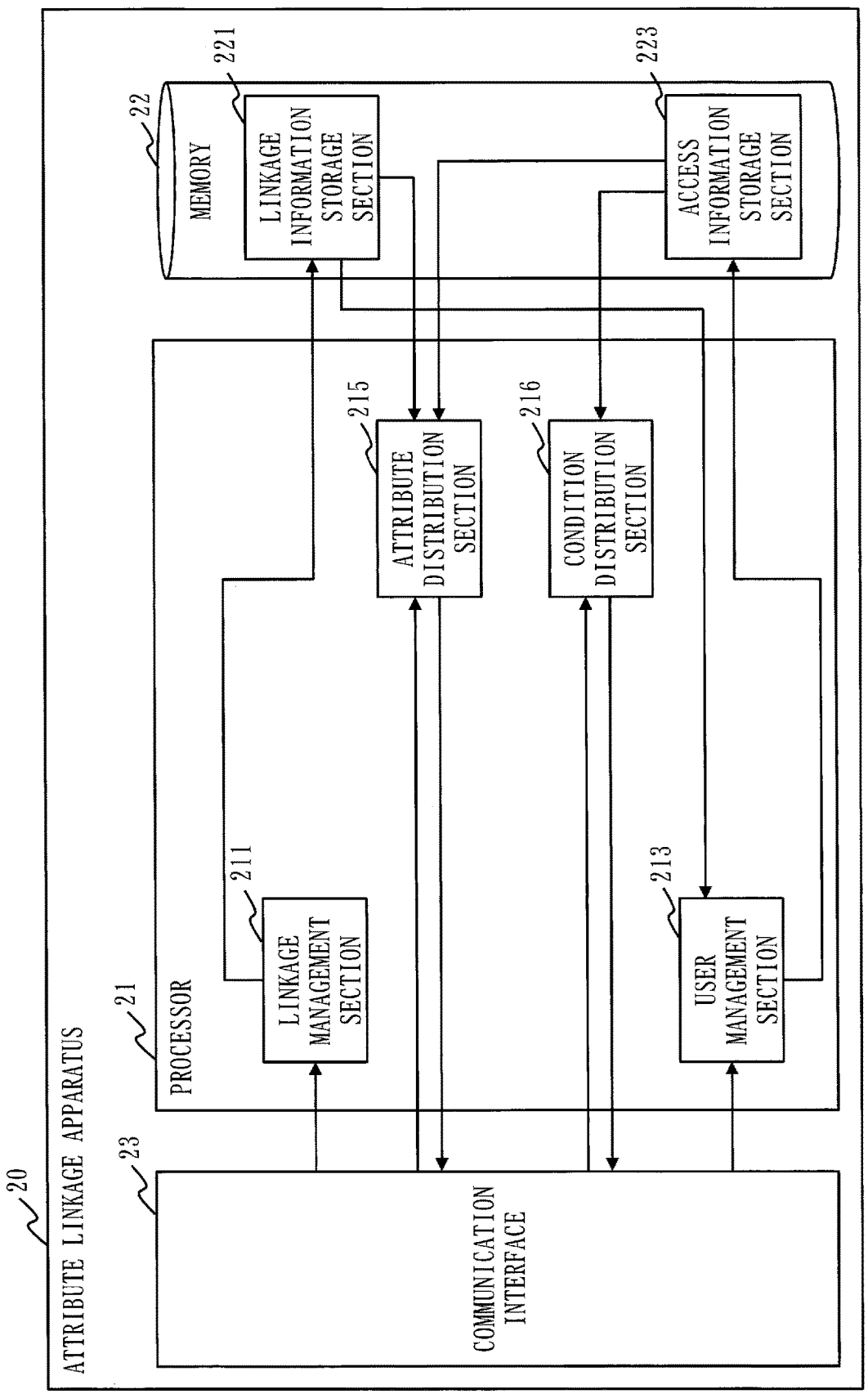
FIG. 28 is a configuration diagram of the attribute linkage apparatus 20 according to the embodiment 5.

The configuration of the attribute linkage apparatus 20 according to the embodiment 5 will be described with reference to FIG. 28.

The attribute linkage apparatus 20 is different from the attribute linkage apparatus 20 illustrated in FIG. 2 in that it does not include the master key generation section 212 and the decryption key generation section 214 as the functional components. In addition, the attribute linkage apparatus 20 is different from the attribute linkage apparatus 20 illustrated in FIG. 2 in that it includes an access information storage section 223 instead of the key storage section 222.

Figure 29:
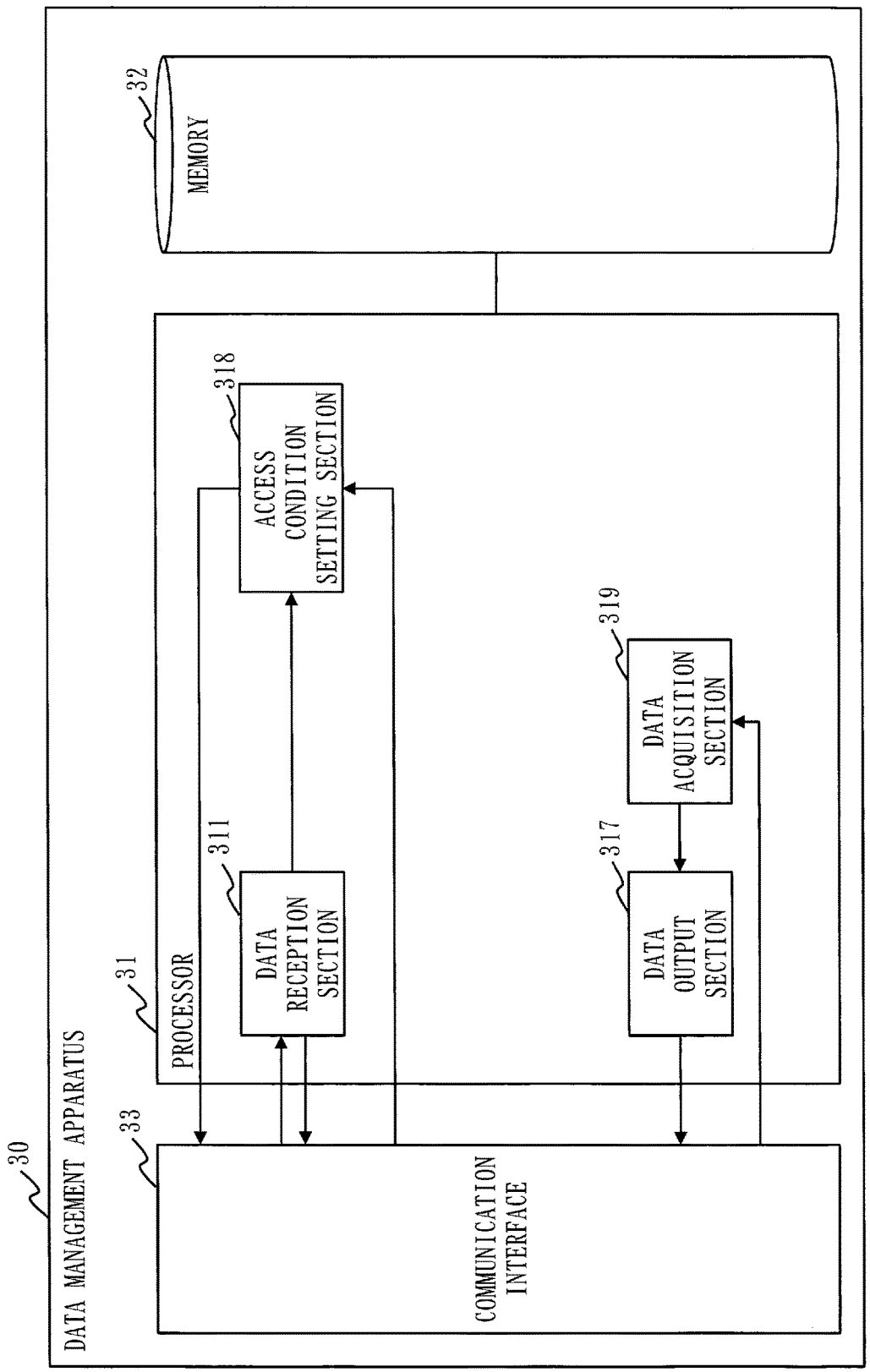
FIG. 29 is a configuration diagram of the data management apparatus 30 according to the embodiment 5.

The configuration of the data management apparatus 30 according to the embodiment 5 will be described with reference to FIG. 29.

The data management apparatus 30 is different from the data management apparatus 30 illustrated in FIG. 3 in that it includes an access condition setting section 318 and a data acquisition section 319 as the functional components instead of the decryption condition setting section 312, the encryption key acquisition section 313, the encryption section 314, the decryption key acquisition section 315, and the decryption section 316. In addition, the data management apparatus 30 is different from the data management apparatus 30 illustrated in FIG. 3 in that it does not include the data storage section 321.

Description of Operation

The operation of the data management system 10 according to the embodiment 5 will be described with reference to FIG. 30 to FIG. 34.

The operation of the data management system 10 according to the embodiment 5 is equivalent to a data management method according to the embodiment 5. In addition, the operation of the data management system 10 according to the embodiment 5 is equivalent to the processing of a data management program according to the embodiment 5.

The operation of the data management system 10 according to the embodiment 5 includes linkage service registration processing, user registration processing, data storage processing, and data acquisition processing.

Linkage Service Registration Processing

Figure 30:
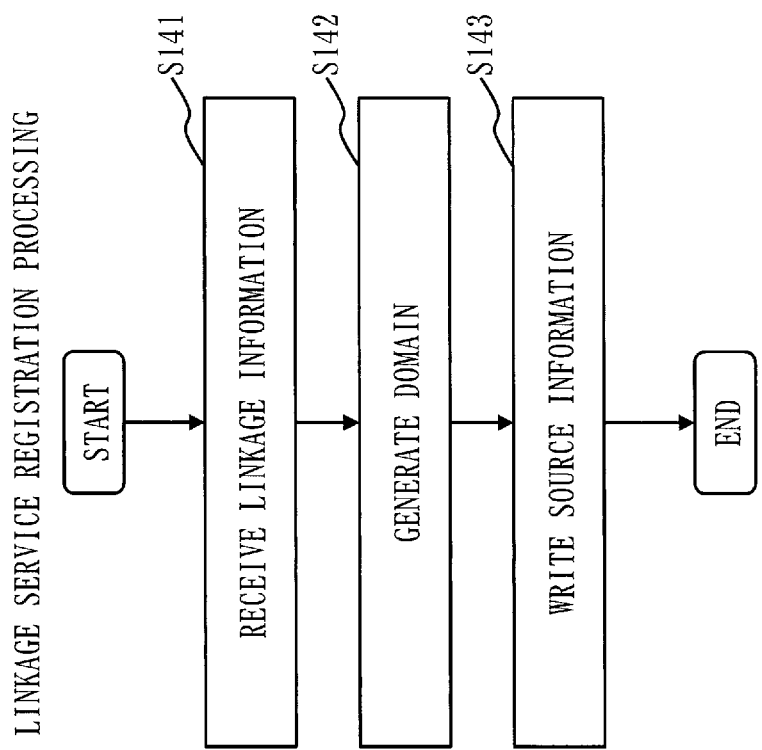
FIG. 30 is a flowchart of linkage service registration processing according to the embodiment 5.

The linkage service registration processing according to the embodiment 5 will be described with reference to FIG. 30.

The processing from step S141 to step S143 is the same as the processing of step S101 to step S103 in FIG. 4. In other words, the linkage service registration processing is different from that of the embodiment 1 in that it does not have the processing of step S104.

User Registration Processing

Figure 31:
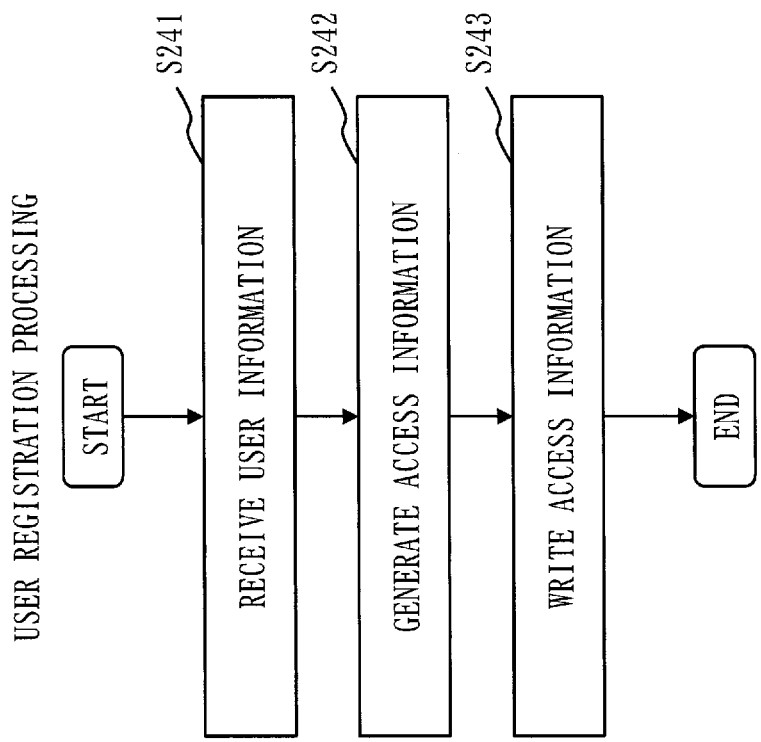
FIG. 31 is a flowchart of user registration processing according to the embodiment 5.

The user registration processing according to the embodiment 5 will be described with reference to FIG. 31.

The processing of step S241 is the same as the processing of step S201 in FIG. 7.

(Step S242: Access Information Generation Processing)

The user management section 213 reads source information corresponding to the apparatus ID included in the user information received in step S241 from the linkage information storage section 221. The user management section 213 acquires attribute information corresponding to the user ID included in the user information received in step S241 from the acquisition destination indicated by the read source information. The user management section 213 uses the acquired attribute information as access information.

(Step S243: Access Information Storage Processing)

Figure 32:
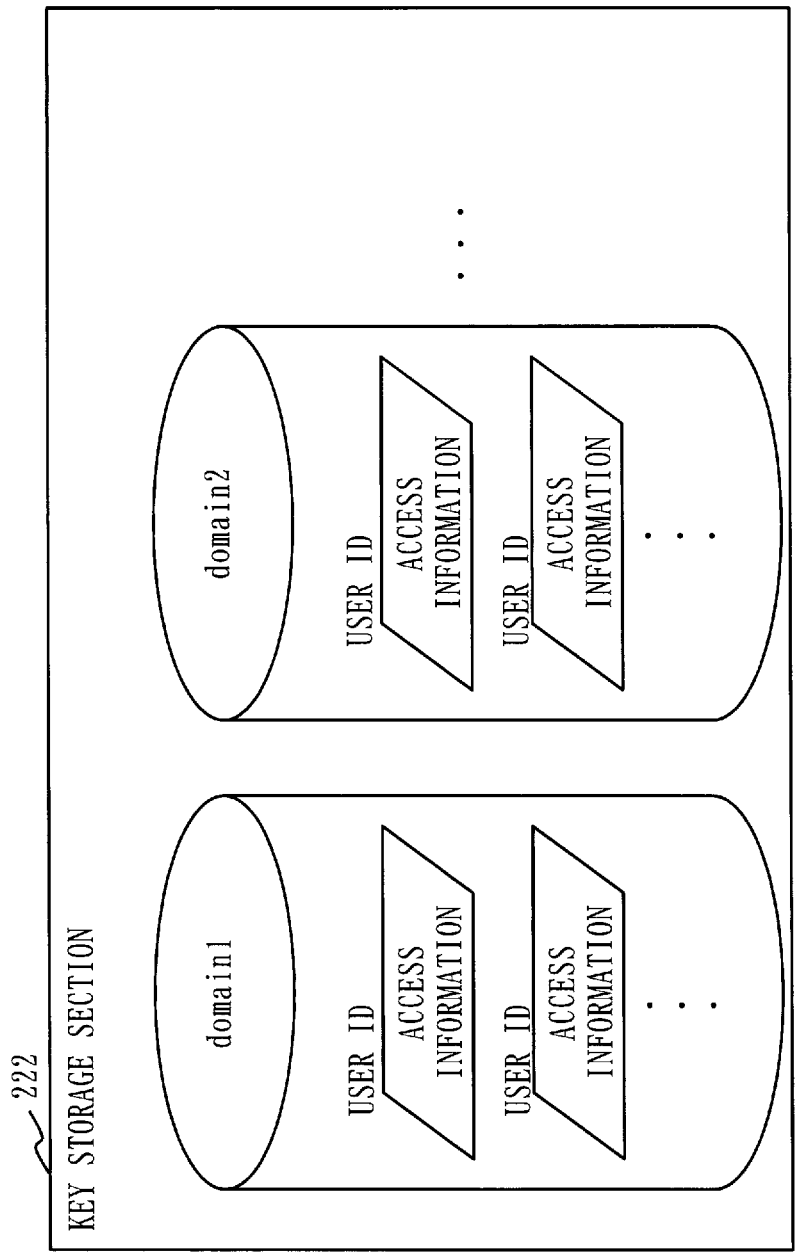
FIG. 32 is an explanatory diagram of information stored in an access information storage section 223 according to the embodiment 5.

The user management section 213 reads a domain corresponding to the apparatus ID included in the user information received in step S241 from the linkage information storage section 221. The user management section 213 associates the access information with the user ID and the domain and writes the access information into the access information storage section 223 via the communication interface 23. As a result, as illustrated in FIG. 32, access information corresponding to the user ID is stored for each domain in the access information storage section 223.

Data Storage Processing

The data storage processing according to the embodiment 5 will be described with reference to FIG. 33.

The data storage processing is executed by the attribute linkage apparatus 20, the target data management apparatus 30 and the storage apparatus 80. The data storage processing is a processing corresponding to the encryption processing of the embodiment 1, and data is stored in the storage apparatus 80.

The processing from step S341 to step S342 is the same as the processing from step S301 to step S302 in FIG. 10.

(Step S343: Access Condition Reception Processing)

The access condition setting section 318 of the target data management apparatus 30 receives an input of an access condition in which the attribute information managed by each data management apparatus 30 and acquired in step S342 has been combined from the user 50 of the data management apparatus 30 via the communication interface 33.

As a specific example, the access condition setting section 318 displays the attribute type of the attribute information managed by each data management apparatus 30 in a display device, and causes a decryption condition to be input by specifying an attribute value to be set in the access condition for the attribute type. Like "DEPARTMENT=ACCOUNTING DEPARTMENT AND DIVISION=BUDGET DIVISION", the access condition is expressed in a combination of conditions of [attribute type]=[attribute value], operators such as "AND" and "OR" connecting each condition, and "( )" representing the priority of evaluation of a logical expression. "NOT" denoting negation may be used as an operator in some cases.

(Step S344: Data Storage Processing)

The access condition setting section 318 of the target data management apparatus 30 transmits the data received in step S341 and the access condition received in step S343 to the storage apparatus 80 via the communication interface 33.

The data reception section 811 of the storage apparatus 80 receives the transmitted data and the access condition via the communication interface 83. Then the data reception section 811 associates the data and the access condition and writes the data and the access condition into the data storage section 821.

Data Acquisition Processing

The data acquisition processing according to the embodiment 5 will be described with reference to FIG. 34.

The data acquisition processing is executed by the attribute linkage apparatus 20, the target data management apparatus 30 and the storage apparatus 80. The data acquisition processing is a processing corresponding to the decryption processing of the embodiment 1, and the data stored in the storage apparatus 80 is read.

As a premise of the data acquisition processing, a user 50 is logging in to the target data management apparatus 30. For example, the data acquisition processing is started after the data management apparatus 30 authenticates the user 50 by authentication with the user ID and password, biometric authentication, or authentication with an IC card. The user 50 logging in is called a target user.

(Step S441: Data Specification Processing)

The data acquisition section 319 of the target data management apparatus 30 receives a specification of data from the target user via the communication interface 33. The data acquisition section 319 transmits a data acquisition request, which includes information specifying the received data of the target, the domain of the target data management apparatus 30 and the user ID of the target user, to the storage apparatus 80 via the communication interface 33.

(Step S442: Access Information Acquisition Processing)

The request reception section 812 of the storage apparatus 80 receives a data acquisition request via the communication interface 83. The access information acquisition section 814 transmits an access information acquisition request, which includes the domain of the target data management apparatus 30 and the user ID of the target user transmitted in step S441, to the attribute linkage apparatus 20 via the communication interface 83.

Then, the condition distribution section 216 of the attribute linkage apparatus 20 reads the access information corresponding to the user ID from the domain included in the decryption key acquisition request in the access information storage section 223. The condition distribution section 216 transmits the read access information together with the domain to the storage apparatus 80 via the communication interface 23. In this way, the access information acquisition section 814 acquires the access information corresponding to the domain included in the header portion of the ciphertext.

(Step S443: Access Condition Determination Processing)

The access determination section 813 determines whether or not the access information included in the data acquisition request satisfies the access condition associated with the data specified from the information included in the data acquisition request. When the access information satisfies the access condition, the data output section 815 reads data from the data storage section 821 and transmits data to the target data management apparatus 30 via the communication interface 83.

(Step S444: Data Output Processing)

The data output section 317 of the target data management apparatus 30 outputs the data transmitted in step S443 via the communication interface 33.

Effects of the Embodiment 5

As described above, in the data management system 10 according to the embodiment 5, it is possible to perform an access control while taking consistency of attribute information managed by each data management apparatus 30 without using an encryption such a functional encryption.

Embodiment 6

In the embodiment 6, a transfer system 11 which applies the data management system 10 described in the embodiment 5 and transfers data from a transmission apparatus 60 which is a data management apparatus 30 to a reception apparatus 70 which is another data management apparatus 30 will be described. In the embodiment 6, differences from the embodiment 5 will be described.

Description of the Configuration

Figure 35:
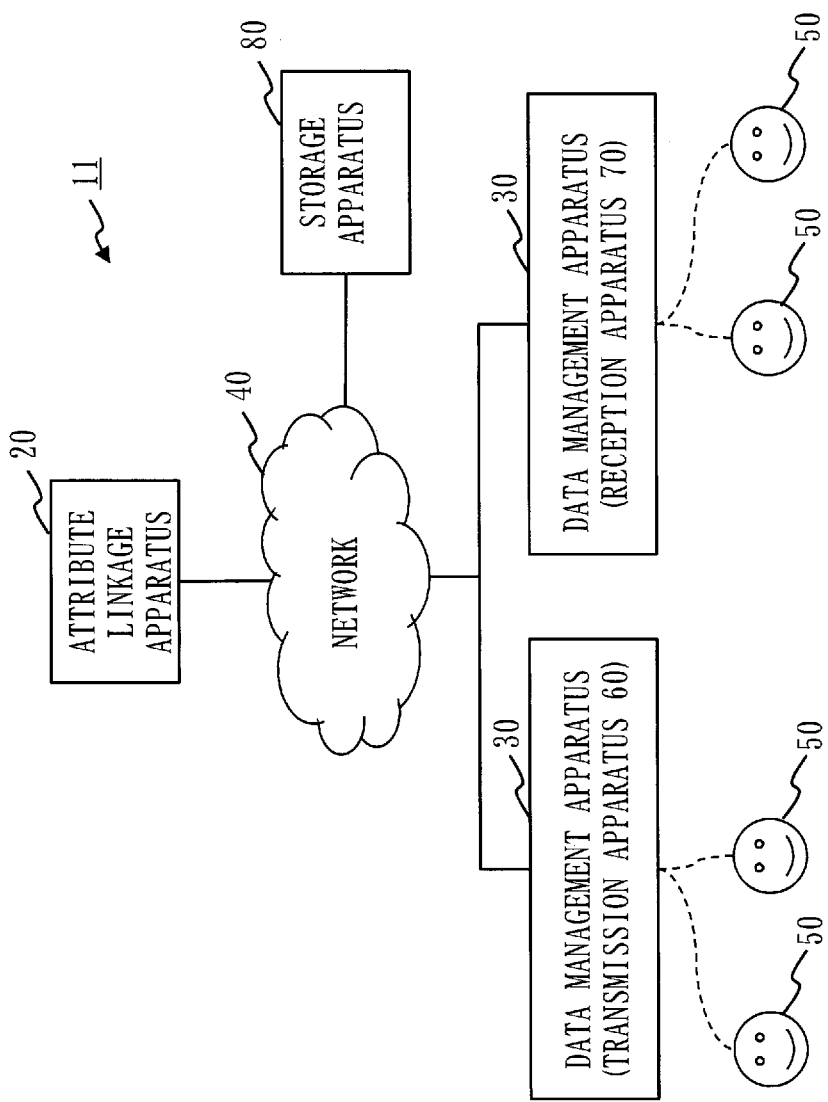
FIG. 35 is a configuration diagram of the transfer system 11 according to an embodiment 6.

The configuration of the transfer system 11 according to the embodiment 6 will be described with reference to FIG. 35.

The transfer system 11 includes the attribute linkage apparatus 20, a plurality of data management apparatuses 30, and the storage apparatus 80. The attribute linkage apparatus 20 and each data management apparatus 30 and the storage apparatus 80 are connected via the network 40.

Here, a data management apparatus 30 is the transmission apparatus 60, and the other data management apparatus 30 is the reception apparatus 70. The transmission apparatus 60 is an apparatus that transmits data, and the reception apparatus 70 is the apparatus that receives data. In the following description, the user 50 of the transmission apparatus 60 is called a transmission user, and the user 50 of the reception apparatus 70 is called a reception user.

Description of Operation

The operation of the transfer system 11 according to the embodiment 6 will be described with reference to FIG. 36 to FIG. 37.

The operation of the transfer system 11 according to the embodiment 6 is equivalent to a transfer method according to the embodiment 6. In addition, the operation of the transfer system 11 according to the embodiment 6 is equivalent to the processing of a transfer program according to the embodiment 6.

The operation of the transfer system 11 according to the embodiment 6 includes linkage service registration processing, user registration processing, transmission processing, and reception processing. The linkage service registration processing and the user registration processing are the same as those in the embodiment 5.

Transmission Processing

The transmission processing according to the embodiment 6 will be described with reference to FIG. 36.

The transmission processing is executed by the transmission apparatus 60. In the transmission processing, data is transmitted from the transmission user of the transmission apparatus 60 to the reception user of the reception apparatus 70.

Figure 33:
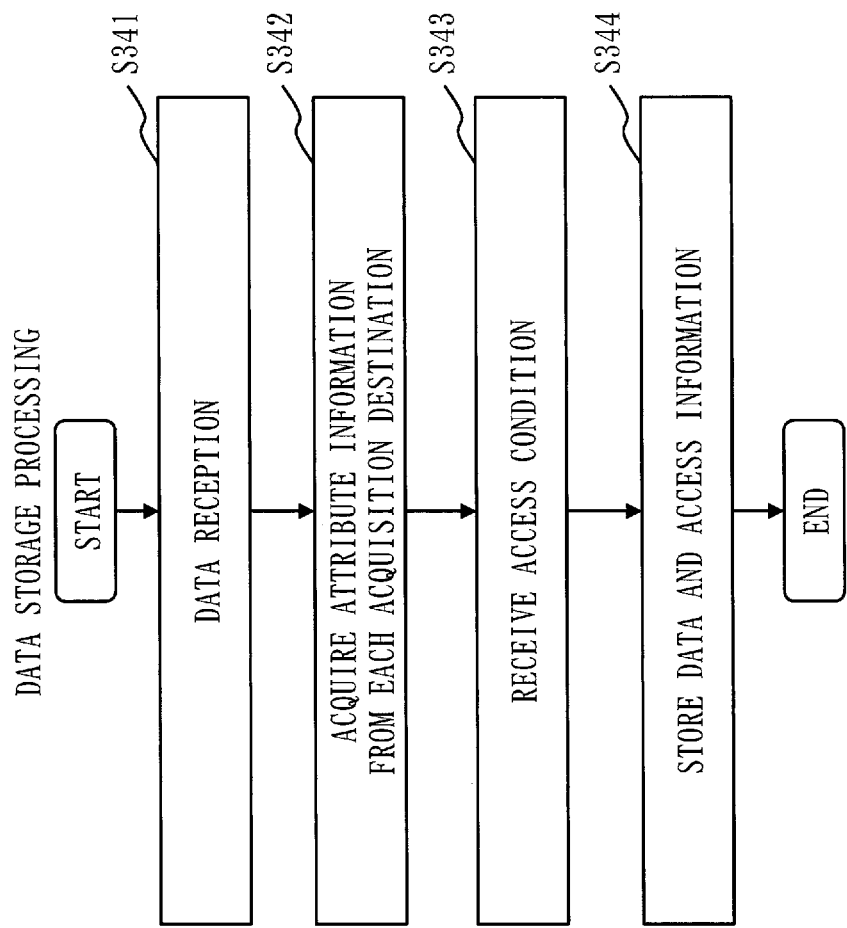
FIG. 33 is a flowchart of data storage processing according to the embodiment 5.

The processing from step S351 to step S353 is the same as the processing from step S341 to step S343 in FIG. 33. In step S353, as an access condition, the attribute of the reception user as the destination of the data is specified.

(Step S354: Data Storage Processing)

The access condition setting section 318 of the transmission apparatus 60 uploads data and an access condition to the storage apparatus 80 via the communication interface 33.

Then, a URL indicating the location where the data has been stored is transmitted from the storage apparatus 80 to the transmission apparatus 60. The access condition setting section 318 transmits the transmitted URL to the reception user of the reception apparatus 70. As a specific example, the access condition setting section 318 transmits an e-mail indicating the URL to the reception user of the reception apparatus 70.

Reception Processing

The reception processing according to the embodiment 6 will be described with reference to FIG. 37.

The reception processing is executed by the reception apparatus 70. In the reception processing, the reception user of the reception apparatus 70 receives data transmitted from the transmission user of the transmission apparatus 60.

Figure 34:
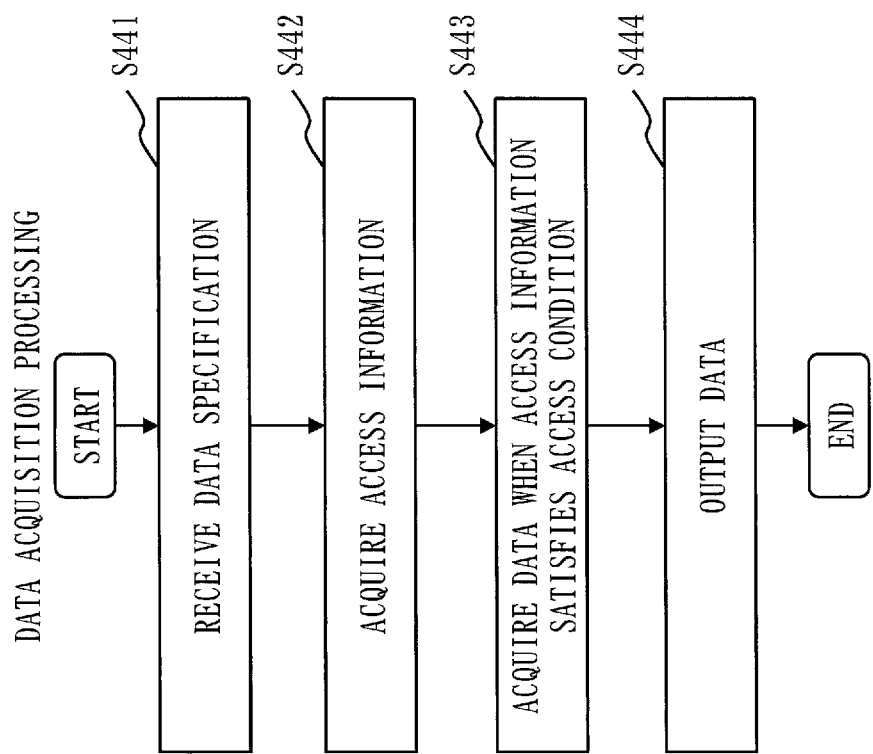
FIG. 34 is a flowchart of data acquisition processing according to the embodiment 5.

The processing from step S452 to step S454 is the same as the processing from step S442 to step S444 in FIG. 34.

(Step S451: Data Specification Processing)

The data acquisition section 319 of the target data management apparatus 30 receives a specification of data from the target user via the communication interface 33. Here, data is specified by indicating the URL transmitted in step S337.

In step S452, the reception user may be authenticated using information such as a Media Access Control (MAC) address of a sender of the URL or an Internet Protocol (IP) address, or a client certificate in a case of using a Secure Sockets Layer (SSL). The processing after step S452 may be executed in a case where the reception user is authenticated.

Effects of the Embodiment 6

As described above, in the transfer system 11 according to the embodiment 6, data can be transferred from the transmission user of the transmission apparatus 60 to the reception user of the reception apparatus 70. In particular, even when attribute information is separately managed by the transmission apparatus 60 and the reception apparatus 70, it is still possible to transfer data after realizing an appropriate access control.

REFERENCE SIGNS LIST

10: data management system, 11: transfer system, 20: attribute linkage apparatus, 21: processor, 22: memory, 23: communication interface, 211: linkage management section, 212: master key generation section, 213: user management section, 214: decryption key generation section, 215: attribute distribution section, 216: condition distribution section, 221: linkage information storage section, 222: key storage section, 223: access information storage section, 30: data management apparatus, 31: processor, 32: memory, 33: communication interface, 311: data reception section, 312: decryption condition setting section, 313: encryption key acquisition section, 314: encryption section, 315: decryption key acquisition section, 316: decryption section, 317: data output section, 318: access condition setting section, 319: data acquisition section, 321: data storage section, 40: network, 50: user, 60: transmission apparatus, 70: reception apparatus, 80: storage apparatus, 81: processor, 82: memory, 83: communication interface, 811: data reception section, 812: request reception section, 813: access determination section, 814: access information acquisition section, 815: data output section, 821: data storage section.

The invention claimed is:

1. An attribute linkage apparatus comprising:
processing circuitry to:
transmit attribute information managed by each of a plurality of data management apparatuses to one of the plurality of data management apparatuses, and cause the one of the plurality of data management apparatuses to specify an access condition to data according to the transmitted attribute information and then store the data, and
transmit, to one of the plurality of data management apparatuses that manages the data, access information in which attribute information relating to a target user out of the attribute information managed by each of the plurality of data management apparatuses has been set, and cause whether the access condition is satisfied to be determined by the one of the plurality of data management apparatus that manages the data according to the access information and an access to the data to be controlled according to the determination,
wherein the processing circuitry causes a ciphertext in which the data has been encrypted by setting the access condition to be stored, and
wherein the processing circuitry uses a decryption key in which attribute information relating to the target user has been set as the access information, and causes the one of the plurality of the data management apparatuses that manages the data to control access to the data by decrypting the ciphertext with the decryption key.

2. The attribute linkage apparatus according to claim 1, wherein
the target user pertains to any one of the plurality of data management apparatuses, and
for each of the plurality of data management apparatuses, the processing circuitry uses, as access information relating to said data management apparatus, a decryption key in which attribute information relating to the target user managed by said data management apparatus has been set, and transmits the decryption key corresponding to the data management apparatus to which the target user pertains.

3. The attribute linkage apparatus according to claim 2, wherein with respect to each of the data management apparatuses, the processing circuitry causes said data management apparatus to store a ciphertext in which the data has been encrypted with a master public key of said data management apparatus, and uses, for each of the data management apparatuses, the decryption key generated with a master private key of said data management apparatus as access information relating to said data management apparatus.

4. The attribute linkage apparatus according to claim 3, wherein the processing circuitry generates the decryption key when a decryption key acquisition request is received, and causes the ciphertext to be decrypted with the generated decryption key.

5. The attribute linkage apparatus according to claim 2, wherein the processing circuitry generates the decryption key when a decryption key acquisition request is received, and causes the ciphertext to be decrypted with the generated decryption key.

6. The attribute linkage apparatus according to claim 2, wherein the processing circuitry causes a ciphertext in which the data has been encrypted with a common master public key of the plurality of data management apparatuses to be stored, and uses, for each of the data management apparatus, the decryption key generated by the common master private key of the plurality of data management apparatuses as access information relating to said data management apparatus.

7. The attribute linkage apparatus according to claim 1, wherein the processing circuitry generates the decryption key when a decryption key acquisition request is received, and causes the ciphertext to be decrypted with the generated decryption key.

8. A transfer system comprising:

an attribute linkage apparatus; and a transmission apparatus and a reception apparatus, which are respective ones of a plurality of data management apparatuses communicatively linked to the attribute linkage apparatus, wherein the attribute linkage apparatus includes processing circuitry to:

transmits attribute information managed by each of the plurality of data management apparatuses to the transmission apparatus, and cause the transmission apparatus to specify an access condition to data according to the transmitted attribute data and then store the data, transmit, to the reception apparatus, access information to the reception apparatus, transmit attribute information managed by each of the plurality of data management apparatus to the transmission apparatus, and cause the transmission apparatus to specify an access condition to data according to the attribute information and store data in a storage apparatus, and transmit to the reception apparatus, which manages the data, access information in which attribute information relating to a target user out of the attribute information managed by each of the plurality of data management apparatuses has been set, and cause the reception apparatus to determine whether the access condition is satisfied according to the access information and to permit access to the data when the access information satisfies the access condition, wherein the processing circuitry causes a ciphertext in which the data has been encrypted by setting the access information to be stored, and wherein the processing circuitry uses a decryption key in which attribute information relating to the target user has been set as the access information, and causes the reception apparatus to permit access to the data by decrypting the ciphertext with the decryption key.

9. The transfer system according to claim 8, wherein the target user pertains to any one of the plurality of data management apparatuses, and for each of the plurality of data management apparatuses, the processing circuitry uses, as access information relating to said data management apparatus, a decryption key in which attribute information relating to the target user managed by said data management apparatus has been set, and transmits the decryption key corresponding to the data management apparatus to which the target user pertains.

10. The transfer system according to claim 9, wherein with respect to each of the data management apparatuses, the processing circuitry causes said data management apparatus to store a ciphertext in which the data has been encrypted with a master public key of said data management apparatus, and uses, for each of the data management apparatuses, the decryption key generated with a master private key of said data management apparatus as access information relating to said data management apparatus.

11. The transfer system according to claim 10, wherein the processing circuitry generates the decryption key when a decryption key acquisition request is received, and causes the ciphertext to be decrypted with the generated decryption key.

12. The transfer system according to claim 9, wherein the processing circuitry generates the decryption key when a decryption key acquisition request is received, and causes the ciphertext to be decrypted with the generated decryption key.

13. The transfer system according to claim 9, wherein the processing circuitry causes a ciphertext in which the data has been encrypted with a common master public key of the plurality of data management apparatuses to be stored, and uses, for each of the data management apparatuses, the decryption key generated by the common master private key of the plurality of data management apparatuses as access information relating to said data management apparatus.

14. The transfer system according to claim 8, wherein
the processing circuitry generates the decryption key when a decryption key acquisition request is received, and
causes the ciphertext to be decrypted with the generated decryption key.

15. An attribute linkage method comprising:
transmitting attribute information managed by each of a plurality of data management apparatuses to any one of the plurality of data management apparatuses, and causing any one of the plurality of data management apparatuses to specify an access condition to data according to the transmitted attribute information and then store the data; and
transmitting, to one of the plurality of data management apparatuses that manages the data, access information in which attribute information relating to a target user out of the attribute information managed by each of the plurality of data management apparatuses has been set, and causing whether the access condition is satisfied to be determined by the one of the plurality of data management apparatus that manages the data according to the access information and an access to the data to be controlled according to the determination,
wherein a ciphertext is stored in which the data has been encrypted by setting the access condition to be stored,
wherein a decryption key, in which attribute information relating to the target user has been set, is used as the access information, and
wherein the one of the data management apparatuses that manages the data is caused to control access to the data by decrypting the ciphertext with the decryption key.

16. A non-transitory computer readable medium storing an attribute linkage program which causes a computer to execute
an attribute distribution processing to transmit attribute information managed by each of a plurality of data management apparatuses to any one of the plurality of data management apparatuses, and to cause any one of the plurality of data management apparatuses to specify an access condition to data according to the transmitted attribute information and then store the data, and
a condition distribution processing to transmit, to one of the plurality of data management apparatuses that manages the data, access information in which attribute information relating to a target user out of the attribute information managed by each of the plurality of data management apparatuses has been set, and to cause whether the access condition is satisfied to be determined by the one of the plurality of data management apparatus that manages the data according to the access information and an access to the data to be controlled according to the determination,
wherein the program causes a ciphertext in which the data has been encrypted by setting the access condition to be stored, and
wherein the program uses a decryption key in which attribute information relating to the target user has been set as the access information, and causes the one of the plurality of the data management apparatuses that manages the data to control access to the data by decrypting the ciphertext with the decryption key.

* * * * *